(12) United States Patent
Shinagawa et al.

(10) Patent No.: US 12,524,067 B2
(45) Date of Patent: Jan. 13, 2026

(54) MIXED REALITY DEVICE, PROCESSING DEVICE, PROCESSING METHOD, AND STORAGE MEDIUM

(71) Applicant: KABUSHIKI KAISHA TOSHIBA, Tokyo (JP)

(72) Inventors: Hiroki Shinagawa, Yokohama Kanagawa (JP); Takanori Yoshii, Kawasaki Kanagawa (JP); Kyotaro Hayashi, Yokohama Kanagawa (JP); Hiroaki Nakamura, Kawasaki Kanagawa (JP); Yoshiyuki Hirahara, Mishima Shizuoka (JP); Masamitsu Fukuda, Yokohama Kanagawa (JP); Takafumi Kozakai, Ota Tokyo (JP); Yasuo Namioka, Nerima Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 18/830,496

(22) Filed: Sep. 10, 2024

(65) Prior Publication Data
US 2025/0123677 A1 Apr. 17, 2025

(30) Foreign Application Priority Data
Oct. 11, 2023 (JP) ................................. 2023-176272

(51) Int. Cl.
*G06F 3/01* (2006.01)
*G06T 17/20* (2006.01)

(52) U.S. Cl.
CPC .............. *G06F 3/011* (2013.01); *G06T 17/20* (2013.01)

(58) Field of Classification Search
CPC ........ G06F 3/011; G06F 3/016; G06F 3/0346; G06T 17/20
See application file for complete search history.

(56) References Cited

U.S. PATENT DOCUMENTS

| | | | |
|---|---|---|---|
| 2007/0085820 A1* | 4/2007 | Suzuki | G10H 1/0008 345/156 |
| 2008/0059131 A1* | 3/2008 | Tokita | G06F 3/011 703/5 |
| 2023/0104917 A1 | 4/2023 | Yamaguchi et al. | |
| 2023/0326096 A1 | 10/2023 | Yoshii et al. | |

FOREIGN PATENT DOCUMENTS

| | | |
|---|---|---|
| JP | 2023-156237 | 10/2023 |
| WO | WO 2021/176645 A1 | 9/2021 |

* cited by examiner

*Primary Examiner* — Nelson M Rosario
(74) *Attorney, Agent, or Firm* — Knobbe, Martens, Olson & Bear, LLP

(57) ABSTRACT

According to one embodiment, a mixed reality device overlays, on a real space, and displays a virtual object in a virtual space. The mixed reality device is configured to obtain a position of an object in the real space and a position of the virtual object. The mixed reality device is configured to change an external appearance of the virtual object when the virtual object is positioned on a far side of the object relative to the mixed reality device and overlaps the object.

11 Claims, 24 Drawing Sheets

MIXED REALITY DEVICE, PROCESSING DEVICE, PROCESSING METHOD, AND STORAGE MEDIUM

CROSS-REFERENCE TO RELATED APPLICATIONS

This application is based upon and claims the benefit of priority from Japanese Patent Application No. 2023-176272, filed on Oct. 11, 2023; the entire contents of which are incorporated herein by reference.

FIELD

Embodiments of the invention generally relate to a mixed reality device, a processing device, a processing method, and a storage medium.

BACKGROUND

Devices that overlay, on a real space, and display a virtual space are available. For such devices, there is a demand for a technique for allowing users to more easily grasp the positional relationship between an object in the real space and a virtual object in the virtual space.

DETAILED DESCRIPTION

Figure 1:
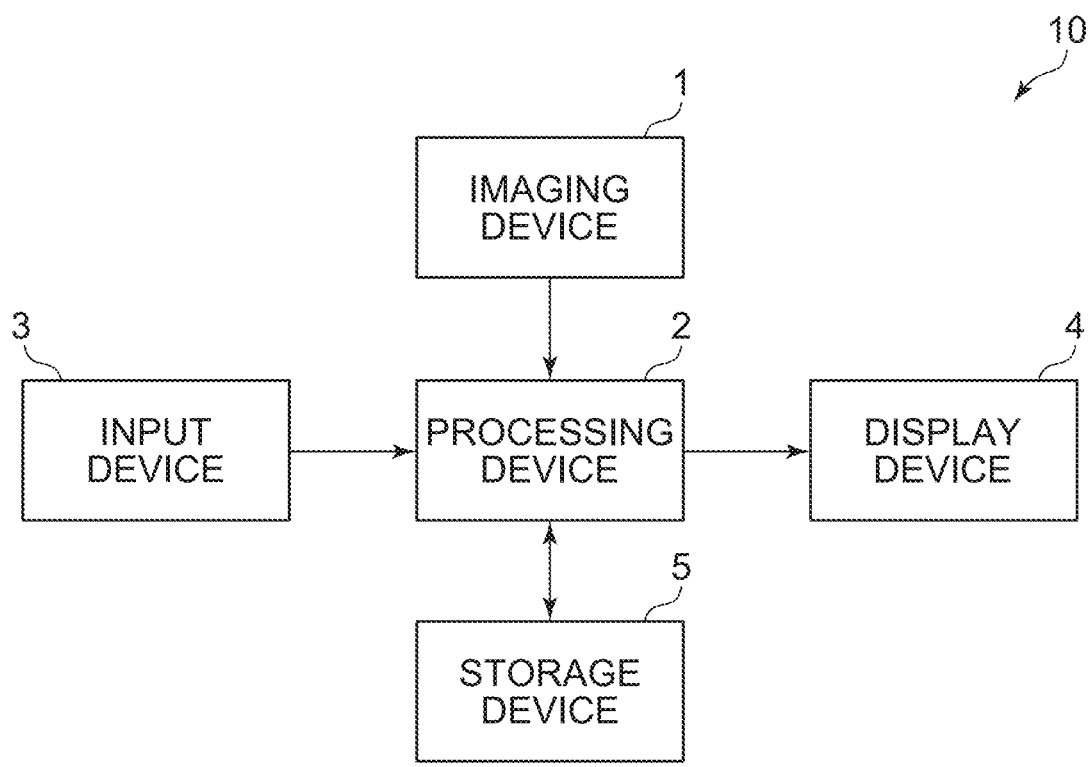
FIG. 1 is a schematic diagram showing a configuration of a processing system according to an embodiment.

According to one embodiment, a mixed reality device overlays, on a real space, and displays a virtual object in a virtual space. The mixed reality device is configured to obtain a position of an object in the real space and a position of the virtual object. The mixed reality device is configured to change an external appearance of the virtual object when the virtual object is positioned on a far side of the object relative to the mixed reality device and overlaps the object.

Hereinafter, embodiments of the invention will be described with reference to the drawings. The drawings are schematic or conceptual, and the relationship between the thickness and width of each portion, the proportions of sizes among portions, and the like are not necessarily the same as the actual values. Even the dimensions and proportion of the same portion may be illustrated differently depending on the drawing. In the specification and drawings, components similar to those already described are marked with like reference numerals, and a detailed description is omitted as appropriate.

FIG. 1 is a schematic diagram showing a configuration of a processing system according to an embodiment.

The invention according to the embodiment is applicable to a task of turning screws with a tool. A processing system 10 includes an imaging device 1, a processing device 2, an input device 3, a display device 4, and a storage device 5 as shown in FIG. 1.

The imaging device 1 images the state of a task and obtains an image. During the task, fastening pieces, such as screws, are tightened into an article with a tool. Alternatively, screws tightened into an article are loosened with a tool. The article is, for example, a component for manufacturing a product, a unit, or a half-finished product. The tool is, for example, a wrench or a driver. Here, an example in which the embodiment of the invention is applied to a fastening task in which screws are tightened will be mainly described.

When assembling an article, a worker tightens screws with a tool in their hand. The imaging device 1 images the left hand or the right hand of the worker holding the tool, the article on which the worker carries out a task, and so on. For example, the imaging device 1 includes a camera that obtains a color image and a depth image. The color image is an image based on visible light and represented by RGB or HSV. The depth image is an image based on reflected light of infrared rays and indicates the distance between the imaging device 1 and a subject. The imaging device 1 for obtaining a color image and the imaging device 1 for obtaining a depth image may be separately provided. To obtain a depth image, a range sensor, such as a laser range finder (LRF), may be used.

The processing device 2 receives successive images (moving image) captured by the imaging device 1. The processing device 2 recognizes a left hand or a right hand in the images. To recognize the left hand or the right hand, hand tracking is used. Hereinafter, when the left hand and the right hand are not distinguished from each other, the term "hand" is simply used to indicate at least either the left hand or the right hand.

The input device 3 is used by the worker to input information into the processing device 2. The input device 3 includes a microphone. The worker can input information into the processing device 2 by utterance toward the input device 3. For example, a voice corresponding to a vocal command is input into the input device 3. The worker can input information into the processing device 2 with, for example, a hand gesture in addition to the input device 3.

The display device 4 displays information for the worker. The processing device 2 causes the display device 4 to display information for supporting a fastening task. Hereinafter, the operation in which the processing device causes the display device to display information may be simply described as "the processing device displays information". For example, the processing device 2 displays a virtual object that indicates a position at which the hand of the worker is to be placed, the result of recognizing the hand, and so on during a fastening task.

The storage device 5 stores data necessary for processing by the processing device 2, data obtained as a result of processing by the processing device 2, and so on. For example, data of tools to be used in tasks, data necessary for calculating the position of a tool, which will be described below, and so on are registered in the storage device 5.

Figure 2:
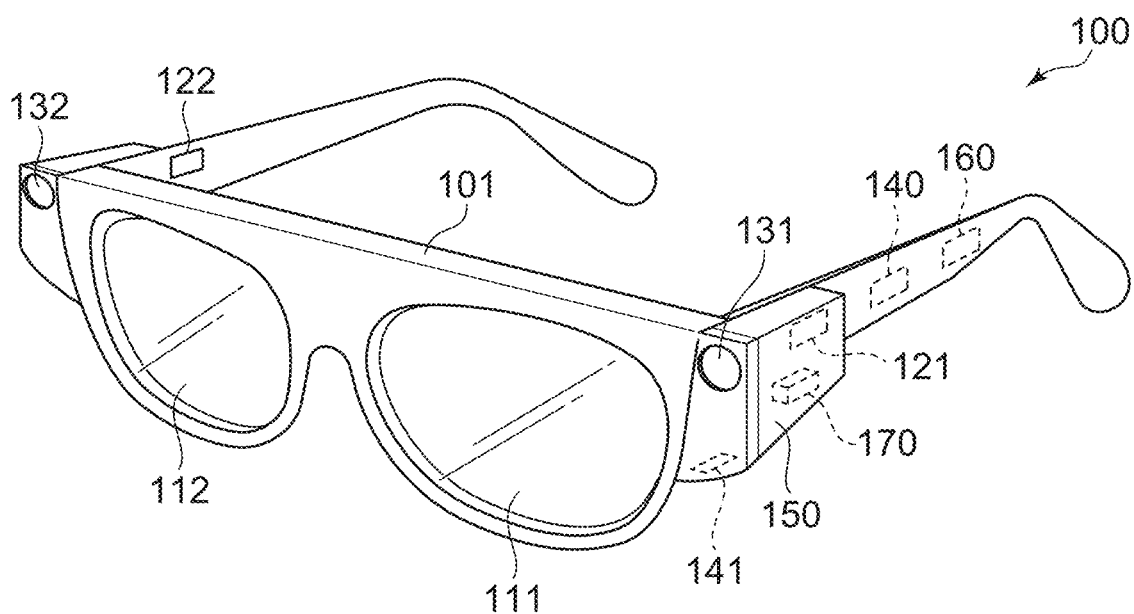
FIG. 2 is a schematic view illustrating a mixed reality device according to the embodiment.

FIG. 2 is a schematic view illustrating a mixed reality device according to the embodiment.

The processing system 10 shown in FIG. 1 is implemented as, for example, a mixed reality (MR) device. An MR device 100 shown in FIG. 2 includes a frame 101, a lens 111, a lens 112, a projection device 121, a projection device 122, an image camera 131, a depth camera 132, a sensor 140, a microphone 141, a processing device 150, a battery 160, and a storage device 170.

The image camera 131 and the depth camera 132 are examples of the imaging device 1. The processing device 150 is an example of the processing device 2. The microphone 141 is an example of the input device 3. The projection device 121 and the projection device 122 are examples of the display device 4. The storage device 170 is an example of the storage device 5.

In the illustrated example, the MR device 100 is a binocular head-mounted display. The two lenses, namely, the lens 111 and the lens 112, are fit into the frame 101. The projection device 121 and the projection device 122 project information onto the lens 111 and the lens 112 respectively.

The projection device 121 and the projection device 122 display, on the lens 111 and the lens 112, the result of recognizing the body of the worker, a virtual object, and so on. Only one of the projection device 121 or the projection device 122 may be provided to display information on only one of the lens 111 or the lens 112.

The lens 111 and the lens 112 are light transmissive. The worker can view the real state through the lens 111 and the lens 112. Further, the worker can view information projected by the projection device 121 and the projection device 122 onto the lens 111 and the lens 112. As a result of projection by the projection device 121 and the projection device 122, information is overlaid on the real space and displayed.

The image camera 131 detects visible light and obtains a two-dimensional image. The depth camera 132 emits infrared light and obtains a depth image on the basis of the infrared light More specifically, the depth camera 132 that is reflected. measures the time of flight (ToF) of light from when infrared light is emitted to when its reflected light is received. As the distance between the depth camera 132 and an object that reflects the infrared light is longer, the ToF becomes longer. Based on the ToF, a depth image of the real space in front of the MR device 100 is generated. The sensor 140 is a six-axis detection sensor and is capable of detecting three-axis angular velocities and three-axis accelerations. The microphone 141 accepts voice input.

The processing device 150 controls the components of the MR device 100. For example, the processing device 150 controls display by the projection device 121 and the projection device 122. The processing device 150 detects movement of the field of view on the basis of the result of detection by the sensor 140. The processing device 150 changes display by the projection device 121 and the projection device 122 in accordance with the movement of the field of view. In addition, the processing device 150 can perform various processes by using data obtained from the image camera 131 and the depth camera 132, data in the storage device 170, and so on.

The battery 160 supplies electric power necessary for operations to the components of the MR device 100. The storage device 170 saves data necessary for processing by the processing device 150, data obtained as a result of processing by the processing device 150, and so on. The storage device 170 may be provided outside the MR device 100 and may communicate with the processing device 150.

The MR device according to the embodiment is not limited to the illustrated example and may be a monocular head-mounted display. The MR device may be of an eyeglasses type as illustrated or may be of a helmet type.

Figure 3:
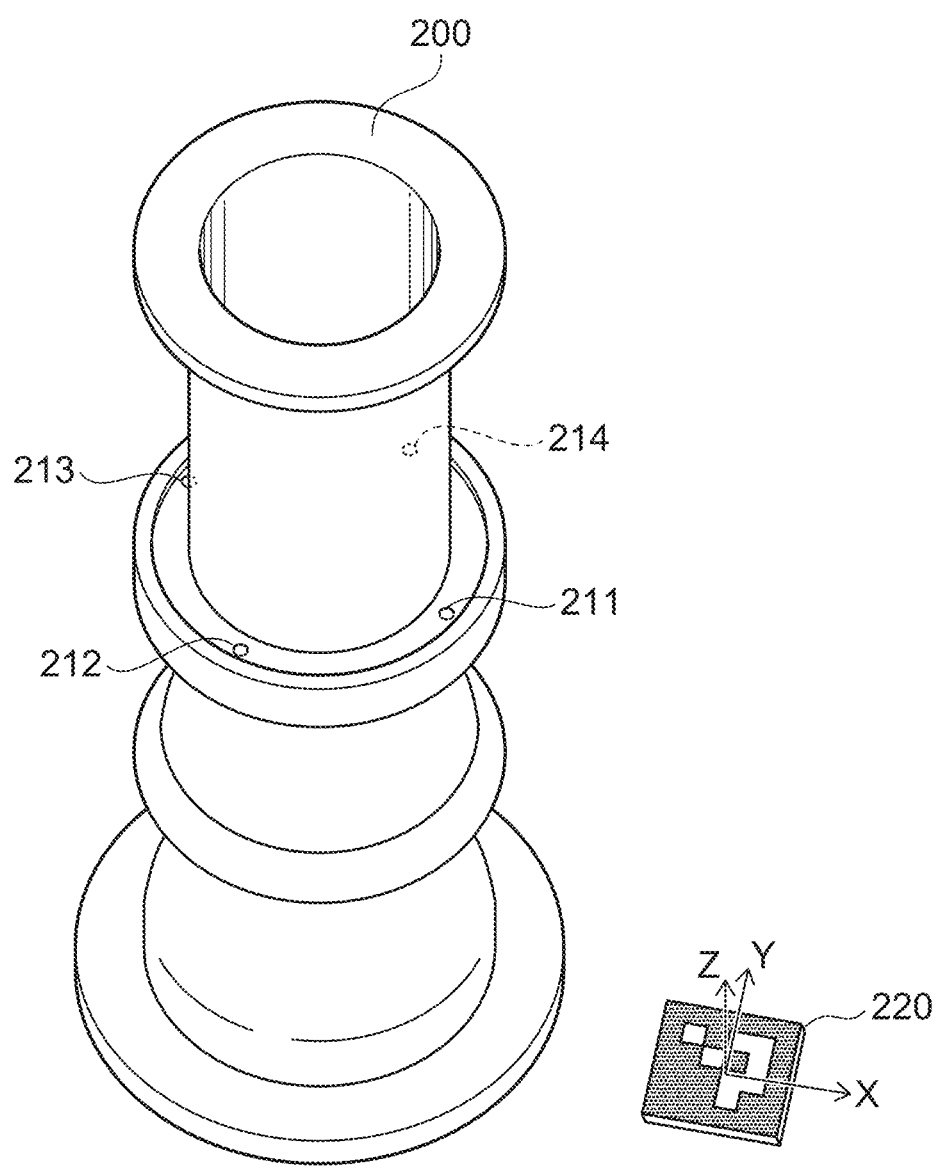
FIG. 3 is a schematic view illustrating an article that is a target of a task.

FIG. 3 is a schematic view illustrating an article that is a target of a task.

For example, a fastening task is performed on an article 200 shown in FIG. 3. The article 200 is a cylindrical hollow member and has fastening locations 211 to 214. The worker tightens a screw at each of the fastening locations 211 to 214 with a wrench.

Near the target of the task, a marker 220 is provided. In the illustrated example, the marker 220 is an AR marker. As described below, the marker 220 is provided to set the origin of a three-dimensional coordinate system. Instead of the AR marker, a one-dimensional code (bar code), a two-dimensional code (QR code (registered trademark)), or the like may be used as the marker 220. Alternatively, instead of the marker, the origin may be indicated with a hand gesture. The processing device 150 sets a three-dimensional coordinate system with reference to a plurality of points indicated with a hand gesture.

FIG. 4 to FIG. 7 are schematic views for explaining example display by the processing system according to the embodiment.

When a fastening task is started, the image camera 131 and the depth camera 132 image the marker 220. The processing device 150 recognizes the marker 220 from the captured images. The processing device 150 sets a three-dimensional coordinate system with reference to the position and orientation of the marker 220.

The image camera 131 and the depth camera 132 image the article 200, the left hand of the worker, and the right hand of the worker. The processing device 150 recognizes the left hand and the right hand from the captured images. When recognizing a left hand 251 and a right hand 252, the processing device 150 measures the positions of the respective hands. Specifically, a hand includes a plurality of joints including the DIP joints, the PIP joints, the MP joints, and the CM joints. The position of any of these joints is used as the position of the hand. The position of the center of gravity of the plurality of joints may be used as the position of the hand. Alternatively, the position of the center of the whole of the hand may be used as the position of the hand.

The processing device 150 causes the projection device 121 and the projection device 122 to display the results of recognition on the lens 111 and the lens 112. Hereinafter, the operation in which the processing device 150 uses and causes the projection devices 121 and 122 to display information on the lenses 111 and 112 respectively may be simply described as "the processing device displays information".

Figure 4:
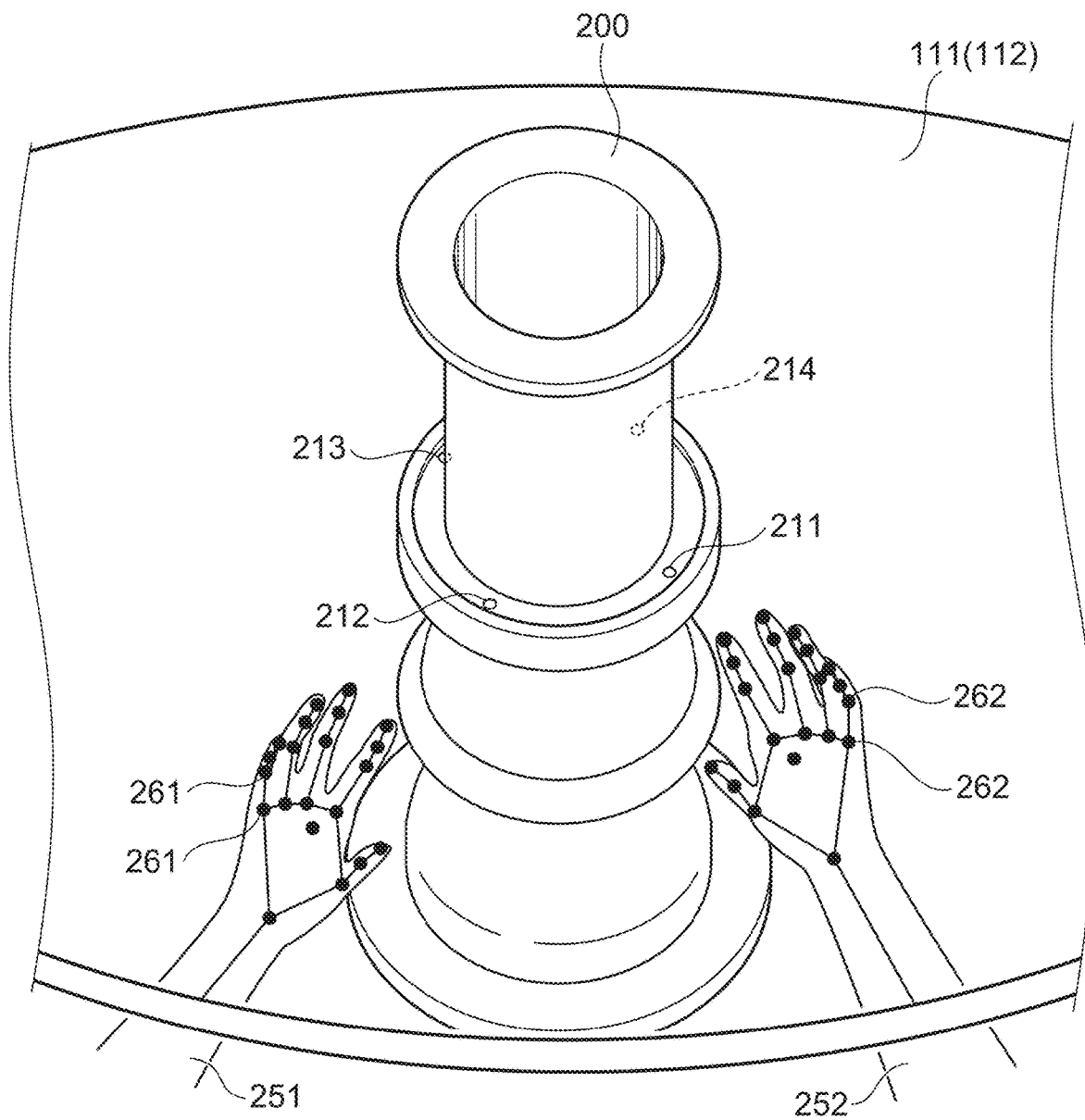
FIG. 4 is a schematic view for explaining example display by the processing system according to the embodiment.

For example, the processing device 150 overlays, on the hands in the real space, and displays the result of recognizing the left hand 251 and the result of recognizing the right hand 252 as shown in FIG. 4. As the results of recognizing the left hand 251 and the right hand 252, a plurality of virtual objects 261 and a plurality of virtual objects 262 are displayed in the illustrated example. The plurality of virtual objects 261 represent a plurality of respective joints of the left hand 251. The plurality of virtual objects 262 represent a plurality of respective joints of the right hand 252. Instead of the joints, virtual objects (meshes) respectively representing the surface shape of the left hand 251 and the surface shape of the right hand 252 may be displayed.

Figure 5:
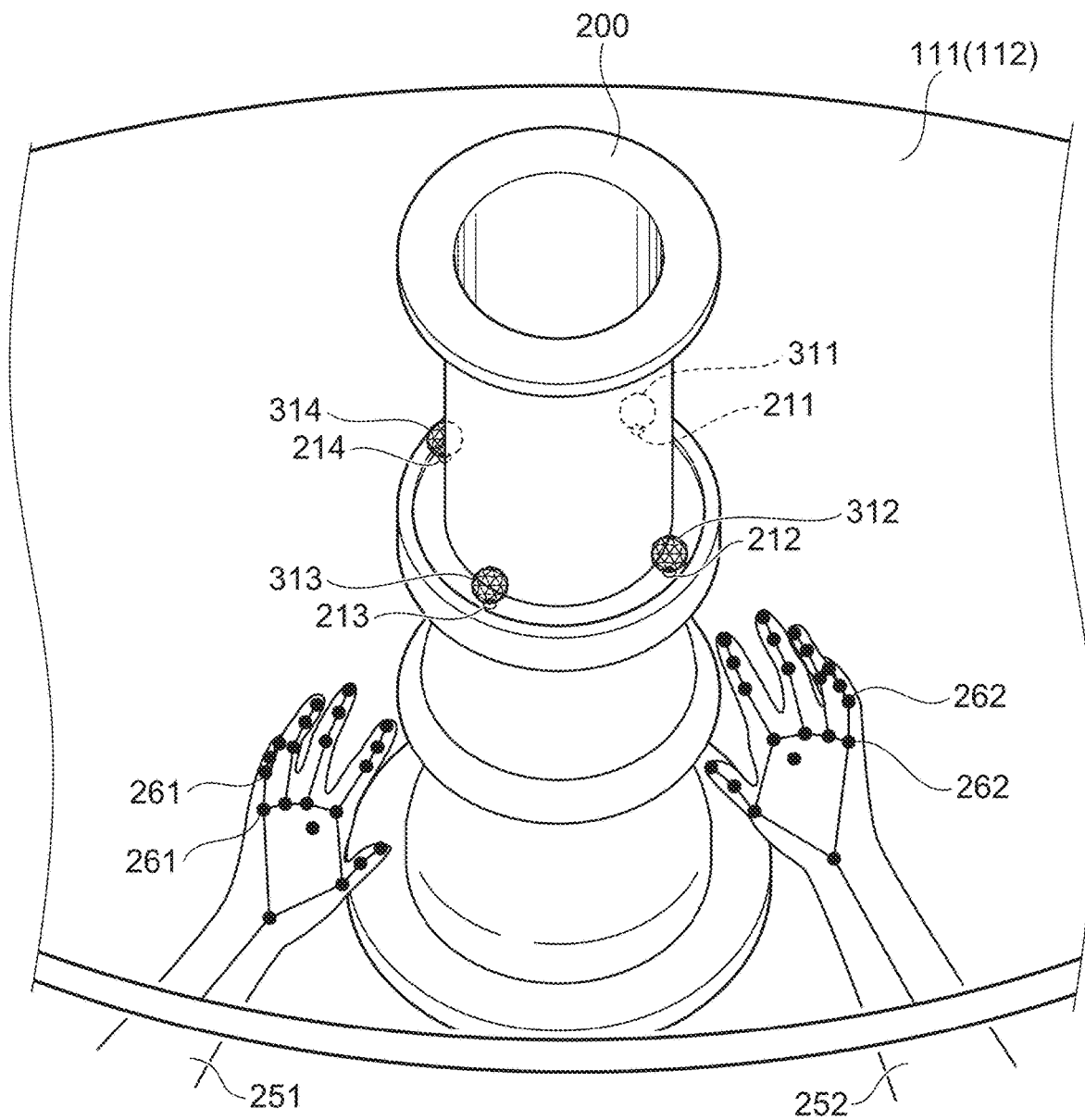
FIG. 5 is a schematic view for explaining example display by the processing system according to the embodiment.

Further, the processing device 150 displays virtual objects 311 to 314 corresponding to the fastening locations 211 to 214 as shown in FIG. 5. The virtual objects 311 to 314 are adjacent to the fastening locations 211 to 214 respectively. The virtual objects 311 to 314 respectively indicate positions at which the hand of the worker is to be placed upon fastening at the fastening locations 211 to 214. The positions at which the virtual objects 311 to 314 are displayed are registered in advance by using the three-dimensional coordinate system based on the origin, which is the marker 220. In the illustrated example, the virtual objects 311 to 314 are spheres. The form, color, and so on of each virtual object can be any form, color, and so on as long as the worker can visually recognize the virtual object as distinguished from the real space.

Figure 6:
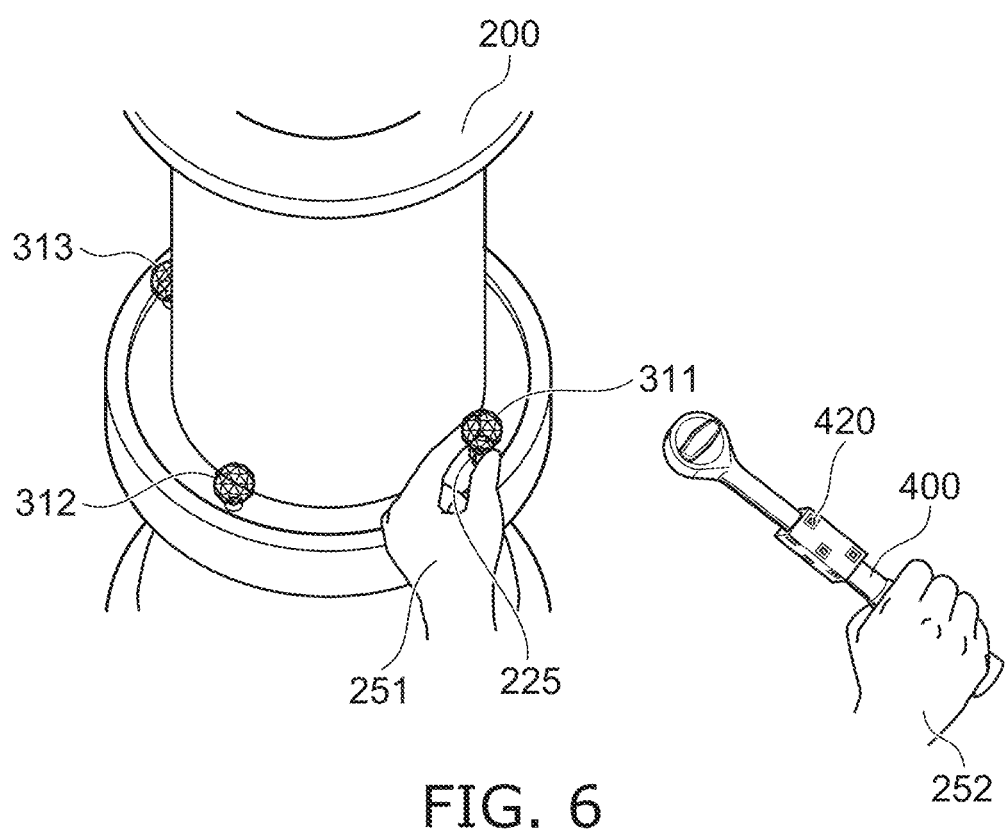
FIG. 6 is a schematic view for explaining example display by the processing system according to the embodiment.
Figure 7:
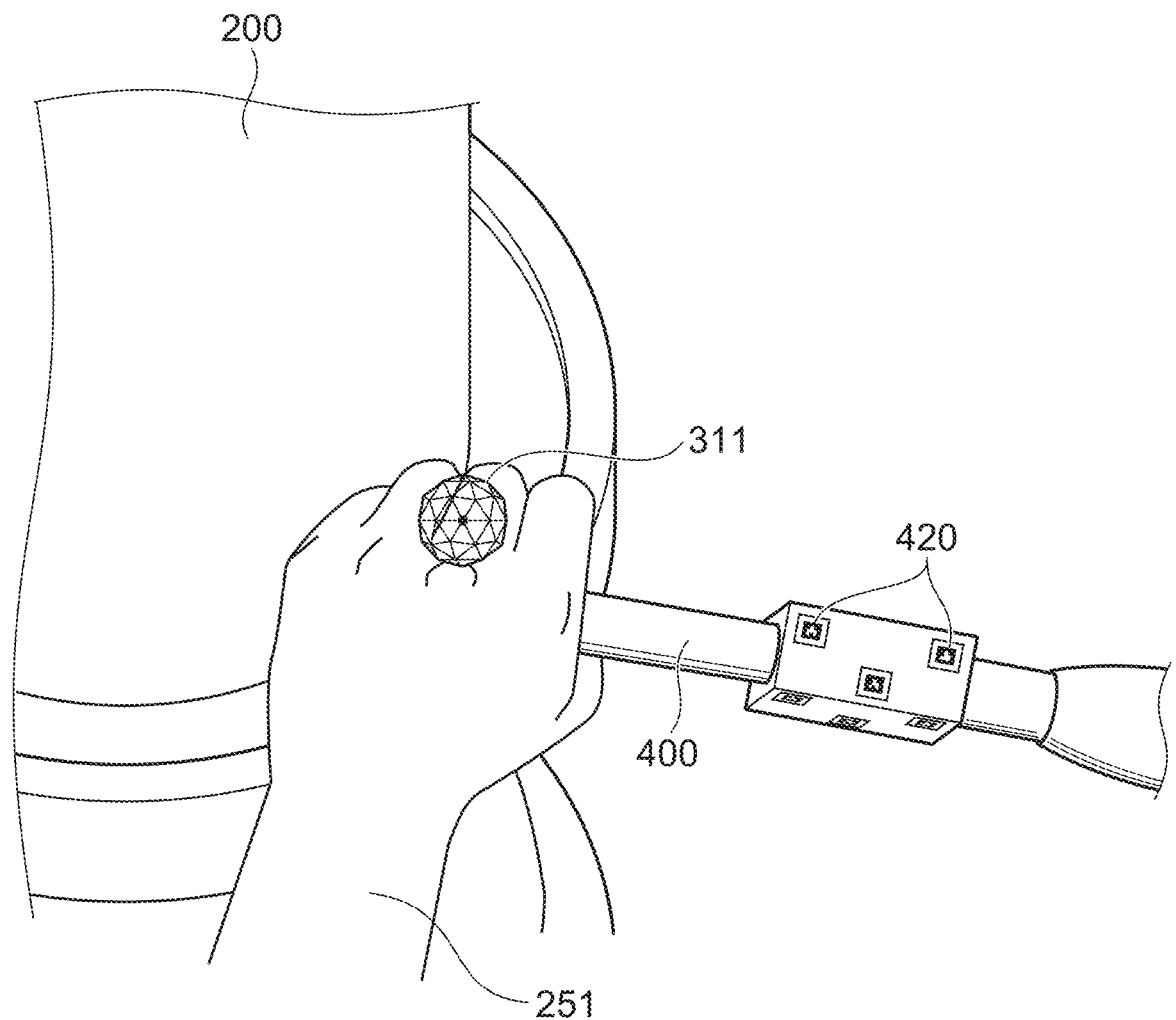
FIG. 7 is a schematic view for explaining example display by the processing system according to the embodiment.

In an example, the worker tightens a screw at the fastening location 211. In this case, the worker places a screw 225 into a tapped hole at the fastening location 211 as shown in FIG. 6. Next, the worker holds the grip of a wrench 400 in their right hand. The worker puts the tip (head) of the wrench 400 having an attached socket, on the screw 225. Thereafter, the worker turns the wrench 400 with the right hand 252 while holding the head of the wrench 400 with the left hand 251 as shown in FIG. 7. Accordingly, the screw 225 is tightened.

In the series of operations described above, the processing device 150 may determine whether the left hand 251 or the right hand 252 comes into contact with any of the virtual objects. Specifically, the processing device 150 calculates the distances between the position of the hand and the virtual objects. When any of the distances is less than a preset threshold value, the processing device 150 determines that the hand comes into contact with the virtual object. In an example, the diameter of the virtual object 311 (sphere) in FIG. 7 corresponds to the threshold value. The sphere represents the range in which the hand is determined to come into contact with the virtual object.

In the example task described above, upon tightening of the screw, the left hand 251 holding the tip of the wrench comes into contact with the virtual object 311. When a hand comes into contact with a virtual object, it can be estimated (inferred) that a screw is turned at a fastening location corresponding to the virtual object. Here, the fastening location that corresponds to the virtual object with which the hand comes into contact, and at which the screw is estimated to be turned is called "estimated location".

When estimating that a screw is turned at a specific fastening location, the processing device 150 creates a task record. For example, the processing device 150 saves data regarding the fastening location 211 and data indicating that the screw has been turned, in association with each other.

Instead of the hand, a contact of the tip of a tool with a virtual object may be determined. For example, a template image of a tool to be used is prepared. The processing device 150 uses the template image to detect the position of the tool from a captured image. Alternatively, a plurality of markers 420 may be provided on the tool as shown in FIG. 6 and FIG. 7. The processing device 150 detects the plurality of markers 420 from a captured image. The processing device 150 calculates the position of the tool on the basis of the positions of the markers 420. The processing device 150 uses the obtained position to determine whether the tip of the tool is in contact with the virtual object.

When a digital tool is used in a task, the processing device 150 may receive a detected value from the digital tool. The digital tool includes a sensor that detects a signal generated during the task. When determining that a screw is tightened at the estimated location, the processing device 150 associates the detected value with the data regarding (for example, the ID of) the fastening location 211. The processing device 150 saves the associated data in the storage device 170. This enables automatic creation of the task record for each fastening location.

When a digital torque wrench or a digital torque driver is used as the tool, the detected value is a torque. Alternatively, a threshold value for a torque may be set in advance. The digital torque wrench or the digital torque driver may determine whether a torque that exceeds the threshold value is detected, and output the result of determination as a detected value.

As described above, the display of a virtual object allows the worker to easily grasp a location at which a task is to be carried out. In the embodiment, the processing device 150 further detects an overlap between an object in the real space and a virtual object in the virtual space. The processing device 150 changes the external appearance or position of the virtual object as appropriate in accordance with the overlap.

First, the processing device 150 obtains the position of an object in the real space and the position of a virtual object in the virtual space. The position of the object in the real space is included in a depth image obtained by the depth camera 132. The processing device 150 obtains the position of the object from the depth image. Alternatively, the position of the object in the real space may be registered in advance. In this case, the position is represented by using the three-dimensional coordinate system in which the marker 220 serves as the origin.

Figure 8:
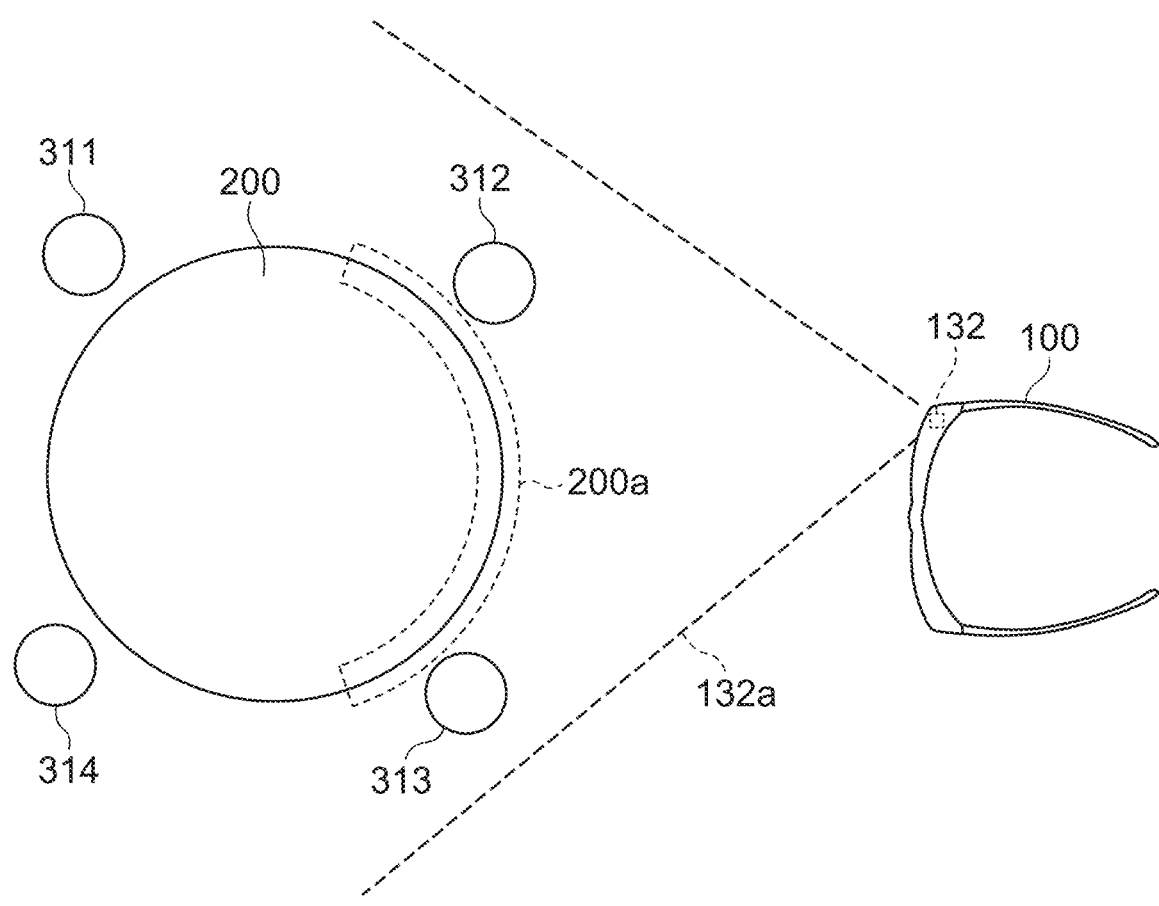
FIG. 8 is a schematic plan view for explaining the embodiment.
Figure 9:
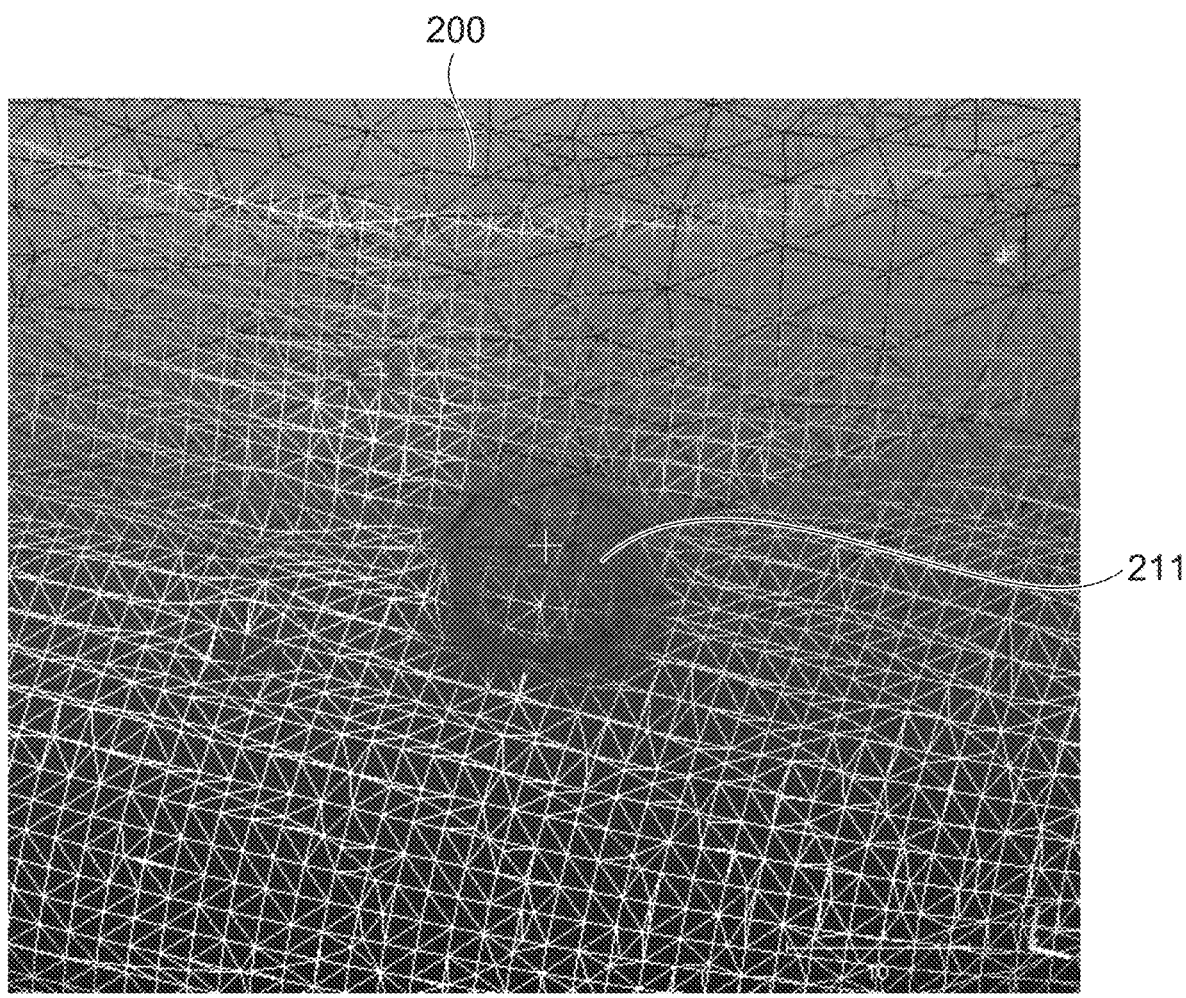
FIG. 9 shows an example depth image.

FIG. 8 is a schematic plan view for explaining the embodiment. FIG. 9 shows an example depth image. FIG. 10 to FIG. 13B are schematic plan views for explaining the embodiment.

In FIG. 8, the depth camera 132 obtains a depth image of the area of a field of view 132*a*. Specifically, a region 200*a*, of the article 200, facing the depth camera 132 is visible to the worker (depth camera 132). The distance between the depth camera 132 and each of the portions of the region 200*a* is measured, and a depth image showing the surface shape and position of the region 200*a* is obtained.

FIG. 9 shows a depth image showing the vicinity of the fastening location 211 of the article 200. For example, the depth camera 132 obtains, as a depth image, mesh data indicating the position of each imaged object. The mesh data is generated by segmenting the imaged area into a plurality of sections (meshes) and assigning a value (position) to each mesh.

The processing device 150 obtains the position of each portion of the region 200*a* from the mesh data. Specifically, the processing device 150 calculates the center point of each mesh. The position of the center point of each mesh is used as the position of a corresponding one of the portions of the region 200*a*. In addition, the position of the workbench on which the article 200 is placed, the position of the wall on the far side of the article 200, and so on may be further obtained by the depth camera 132.

The processing device 150 obtains the position of each of the virtual objects 311 to 314. The processing device 150 calculates the distance between the center point of each mesh and a reference point and the distance between each virtual object and the reference point. As the reference point, the position of the MR device 100 is used. For example, the position of the image camera 131 or the position of the depth camera 132 is used as the reference point. When the MR device 100 measures the viewpoint of the worker, the position of the viewpoint may be used as the reference point.

The processing device 150 determines, for each virtual object of the virtual objects 311 to 314, whether a mesh for which the calculated distance is longer than the distance between the virtual object and the reference point is present. When a mesh for which the calculated distance is longer than the distance between a virtual object and the reference point is present, it is determined that the virtual object is positioned on the near side of the object in the real space. When a mesh for which the calculated distance is longer than the distance between a virtual object and the reference point is not present, it is determined that the virtual object is positioned on the far side of the object in the real space.

Figure 10:
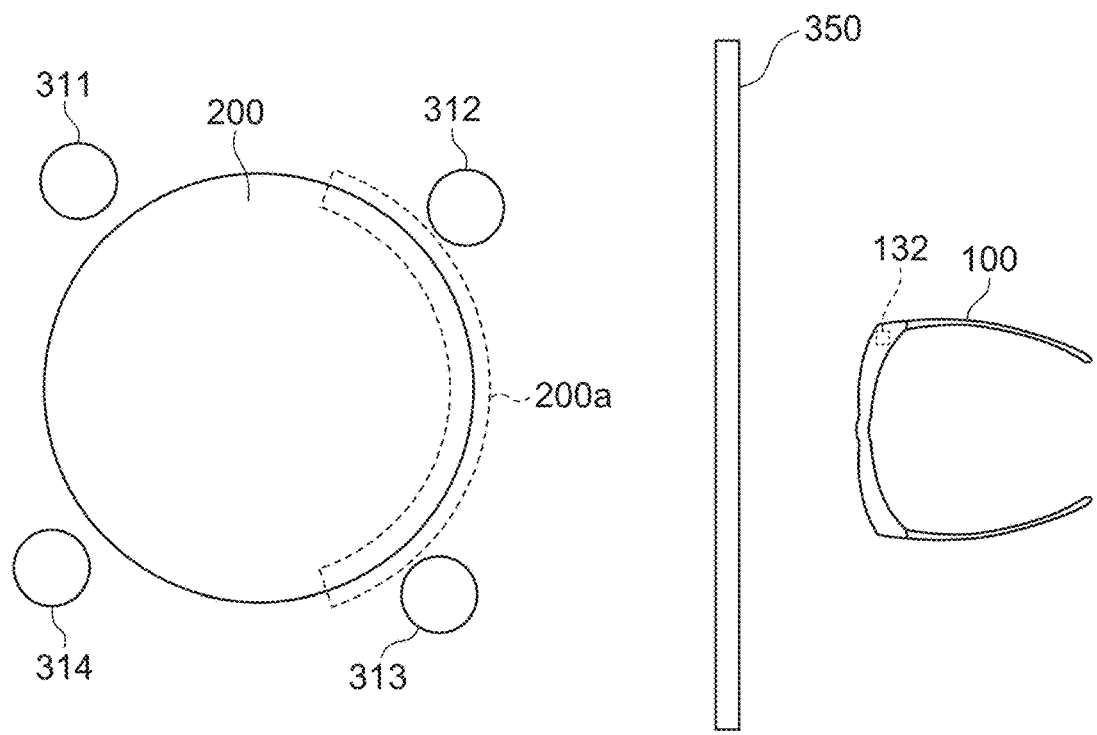
FIG. 10 is a schematic plan view for explaining the embodiment.

Next, the processing device 150 sets a virtual plane 350 as shown in FIG. 10. The virtual plane 350 is set on the near side of the article 200 and the virtual objects 311 to 314. That is, the virtual plane 350 is positioned between the reference point and the article 200 and between the reference point and each of the virtual objects 311 to 314. The processing device 150 projects the article 200 onto the virtual plane 350. Next, the processing device 150 projects a virtual object, among the virtual objects 311 to 314, that is determined to be present on the far side of the article 200, onto the virtual plane 350. In the examples illustrated in FIG. 8 and FIG. 10, the virtual object 311 and the virtual object 314 are determined to be positioned on the far side of the article 200.

Figure 11:
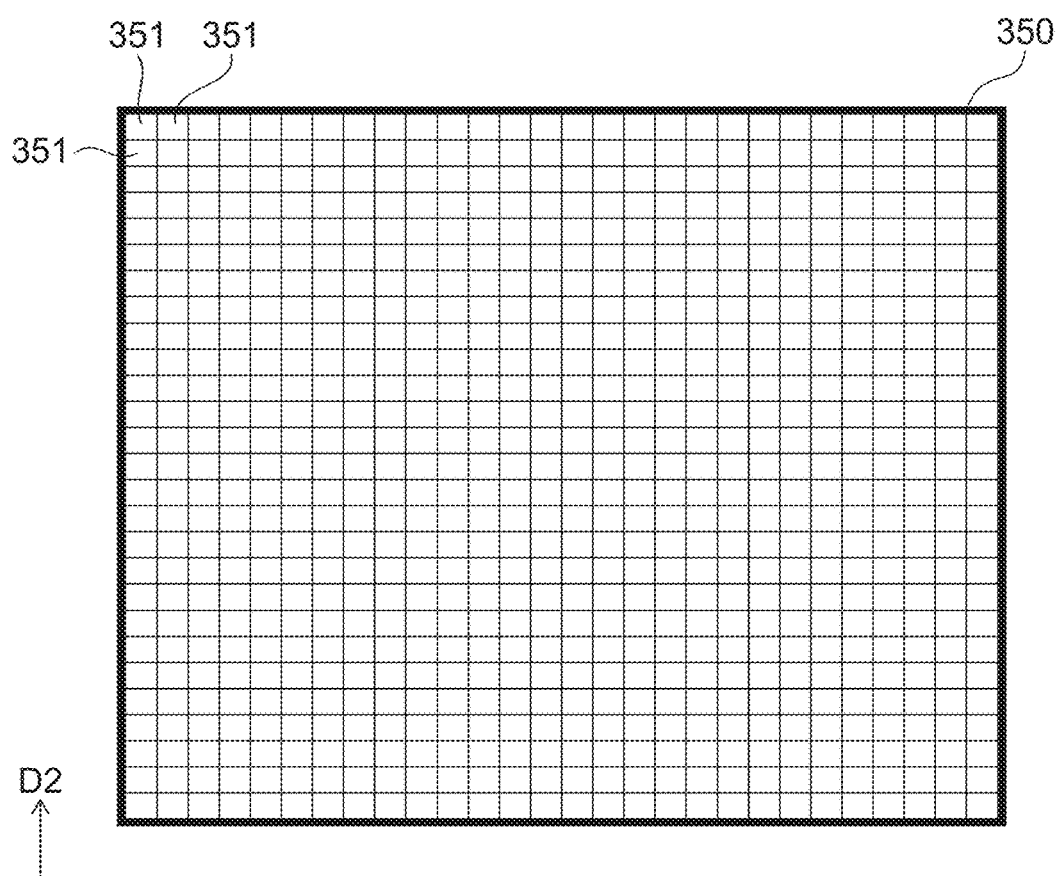
FIG. 11 is a schematic plan view for explaining the embodiment.

A plurality of regions 351 are set on the virtual plane 350 as shown in FIG. 11. The plurality of regions 351 are arranged along a first direction D1 and a second direction D2. The first direction D1 crosses a direction from the reference point toward the article 200 or any of the virtual objects 311 to 314. The second direction D2 is a direction crossing the horizontal plane. For example, the first direction D1 is parallel to the horizontal plane, and the second direction D2 is parallel to the vertical direction.

Figure 12:
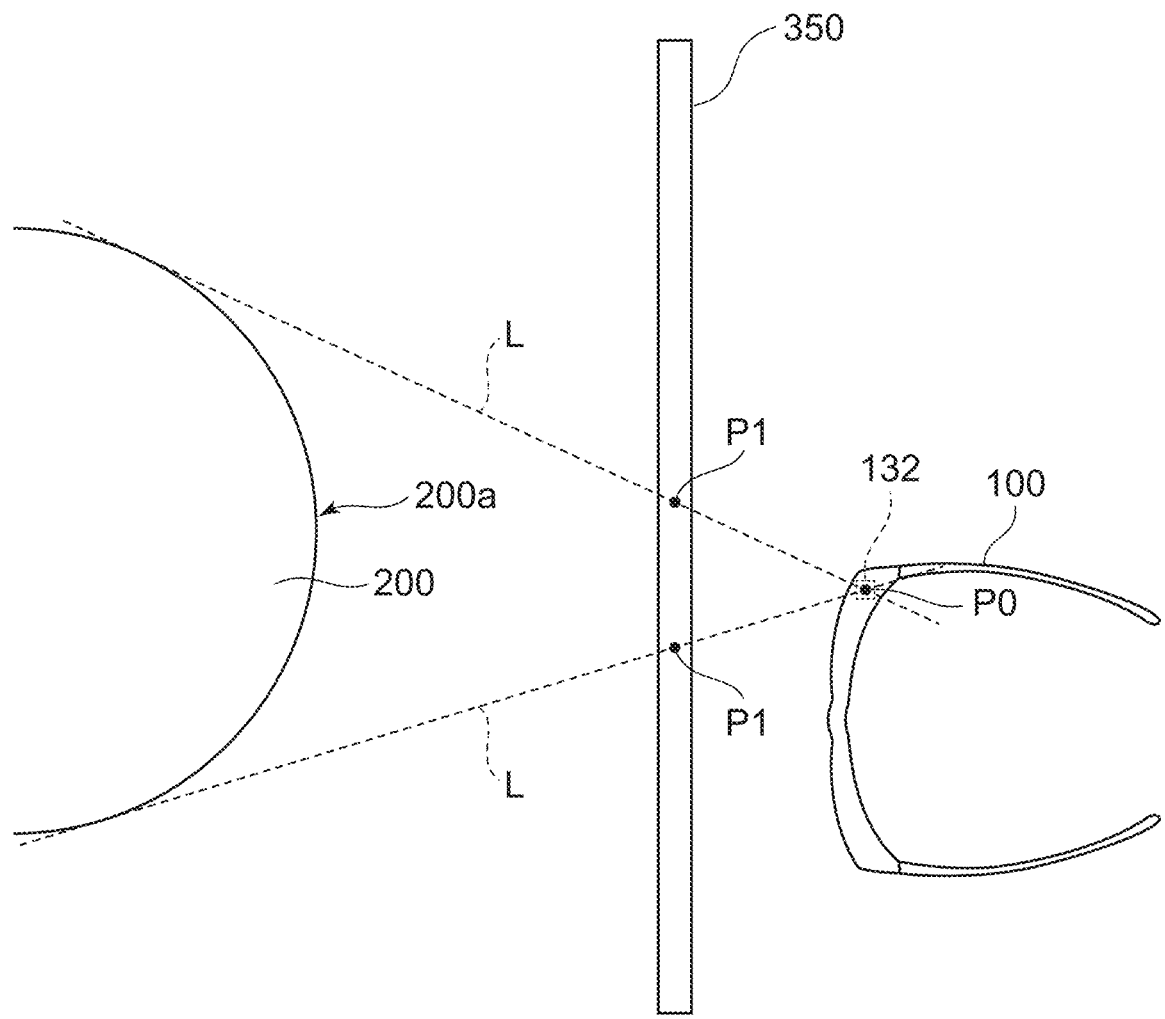
FIG. 12 is a schematic plan view for explaining the embodiment.
Figure 13A:
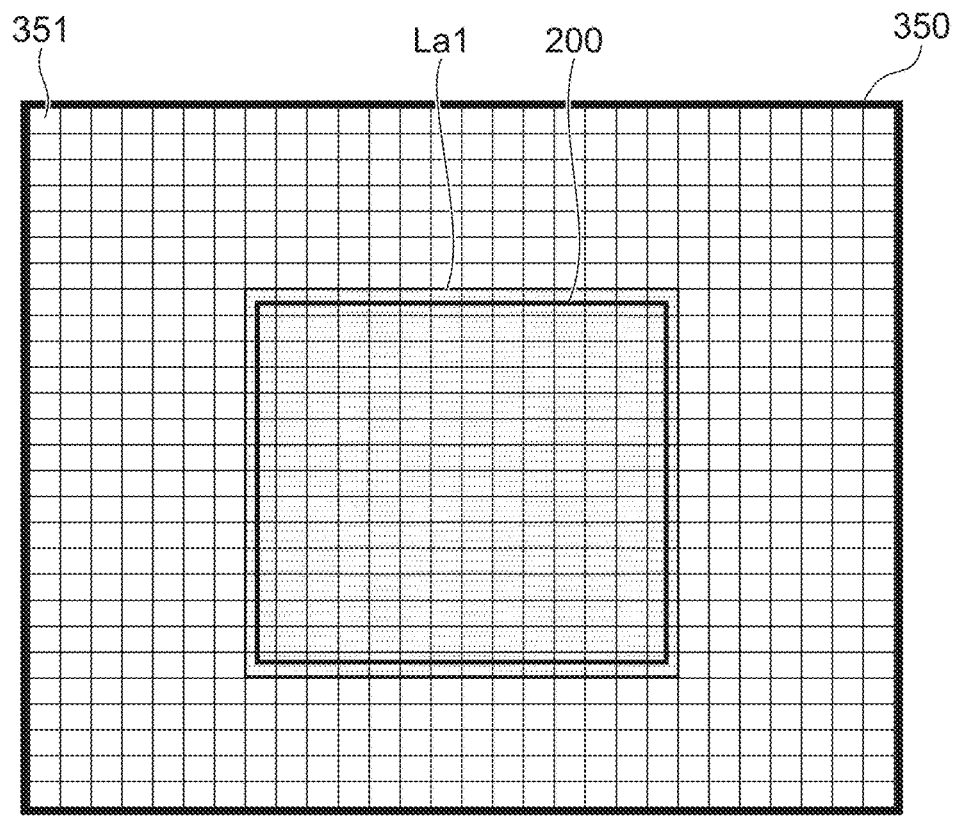
FIG. 13A and FIG. 13B are schematic plan views for explaining the embodiment.

The processing device 150 generates a plurality of straight lines L that connect a reference point P0 and points on the outer edge of the region 200*a* as shown in FIG. 12. The processing device 150 calculates points P1 at which the respective straight lines L intersect with the virtual plane 350. The area surrounded by the points P1 is the region 200*a* projected onto the virtual plane 350. The processing device 150 identifies regions 351, among the plurality of regions 351, that overlap the article 200 as shown in FIG. 13A. The processing device 150 assigns a label La1 to the regions 351 that overlap the article 200.

Figure 13B:
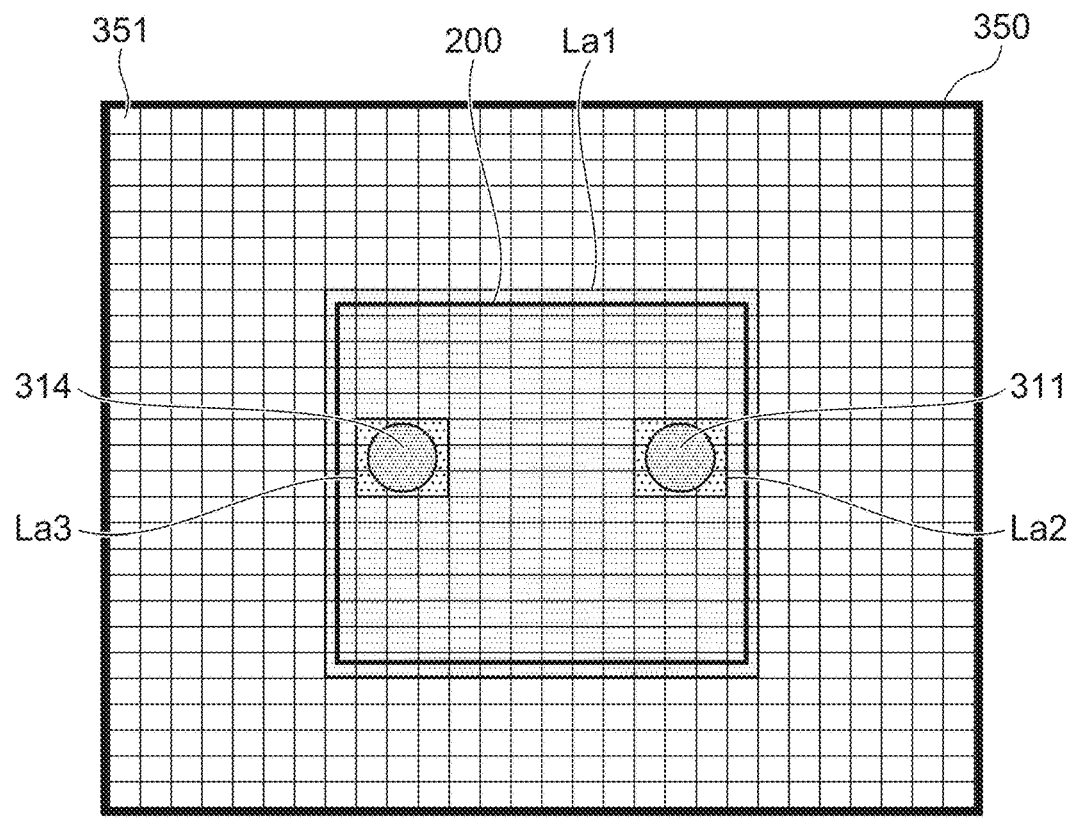

Similarly, the processing device 150 also projects the virtual object 311 and the virtual object 314 onto the virtual plane 350. The processing device 150 identifies, among the plurality of regions 351, regions 351 that overlap the virtual object 311 and regions 351 that overlap the virtual object 314 as shown in FIG. 13B. The processing device 150 assigns a label La2 and a label La3 to the regions 351 that overlap the virtual object 311 and the regions 351 that overlap the virtual object 314 respectively.

At this time, the processing device 150 determines whether the regions 351 that are assigned the label La1 and the regions 351 that are assigned the label LA2 or the label La3 overlap each other. When regions 351 that are assigned both the label La1 and the label La2 are present or when regions 351 that are assigned both the label La1 and the label La3 are present, the article 200 and either of the virtual objects overlap when viewed from the reference point.

In this case, the processing device 150 changes the external appearance of the virtual object 311 and changes the external appearance of the virtual object 314. As a result, the fact that the virtual object 311 and the virtual object 314 are present on the far side of the article 200 is easily known to the worker.

Hereinafter, the process described above for determining whether an object in the real space overlaps a virtual object in the virtual space is referred to as "determination regarding overlapping". A virtual object that is determined, as a result of determination regarding overlapping, to be positioned on the far side of an object in the real space and to overlap the object is referred to as "overlapping object".

Upon determination regarding overlapping, the processing device 150 may generate a straight line that connects the reference point and a virtual object and calculate the distance between each mesh and the straight line. The processing device 150 extracts, from among all of the meshes, meshes for which the distance is less than a preset threshold value. For example, meshes corresponding to another object positioned behind the article 200 or meshes corresponding to a wall are excluded. As a result, only meshes that can overlap the virtual object can be extracted. The processing device 150 uses the extracted meshes to perform determination regarding overlapping. This can reduce the computational load of determination regarding overlapping.

FIG. 14, FIG. 15A, FIG. 15B, FIG. 16A, FIG. 16B, and FIG. 17 are schematic views for explaining example display by the processing system according to the embodiment.

Figure 14:
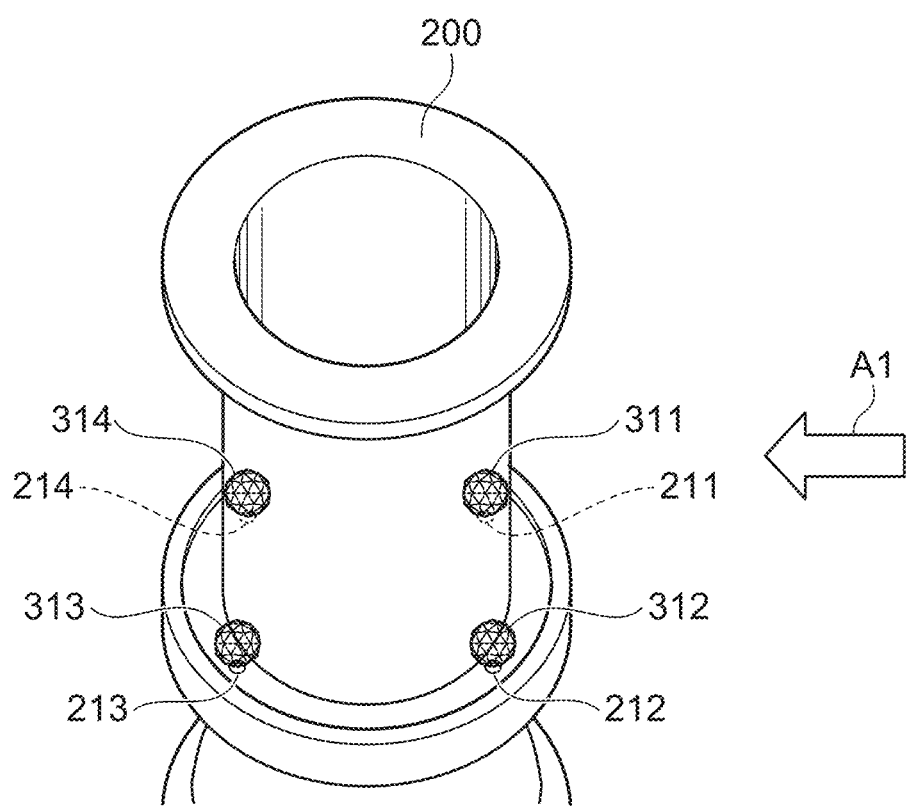
FIG. 14 is a schematic view for explaining example display by the processing system according to the embodiment.

FIG. 14 shows example display when determination regarding overlapping is not performed. In this case, all of the virtual objects are displayed similarly regardless of whether the virtual objects overlap the object in the real space. Therefore, the virtual object 311 and the virtual object 314 are displayed similarly to the virtual object 312 and the virtual object 313. For example, the external appearance (color, shape, etc.) of the virtual object 311 and the external appearance of the virtual object 314 are the same as the external appearance of the virtual object 312 and the external appearance of the virtual object 313. The relative position of the virtual object 311 relative to the fastening location 211 and the relative position of the virtual object 314 relative to the fastening location 214 are the same as the relative position of the virtual object 312 relative to the fastening location 212 and the relative position of the virtual object 313 relative to the fastening location 213.

Figure 15A:
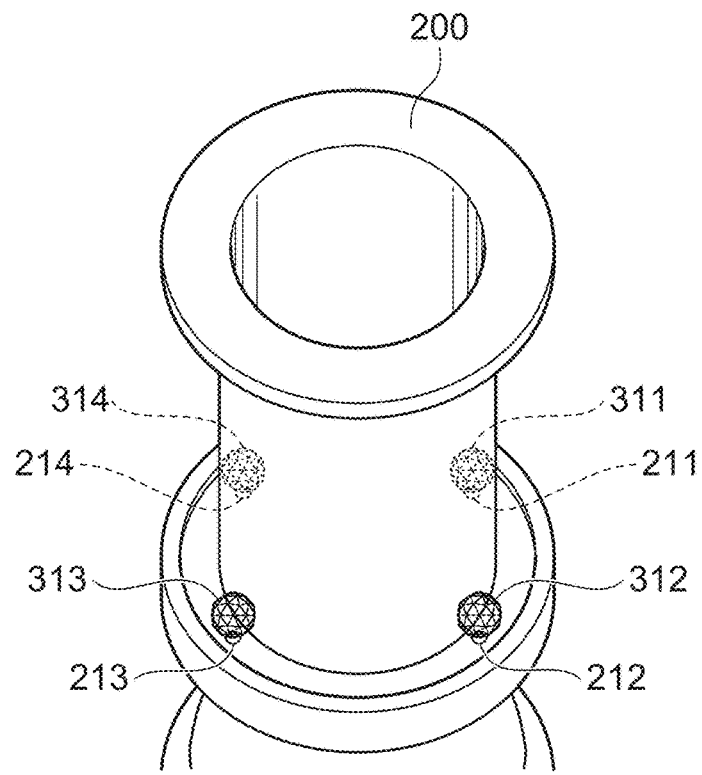
FIG. 15A and FIG. 15B are schematic views for explaining example display by the processing system according to the embodiment.
Figure 15B:
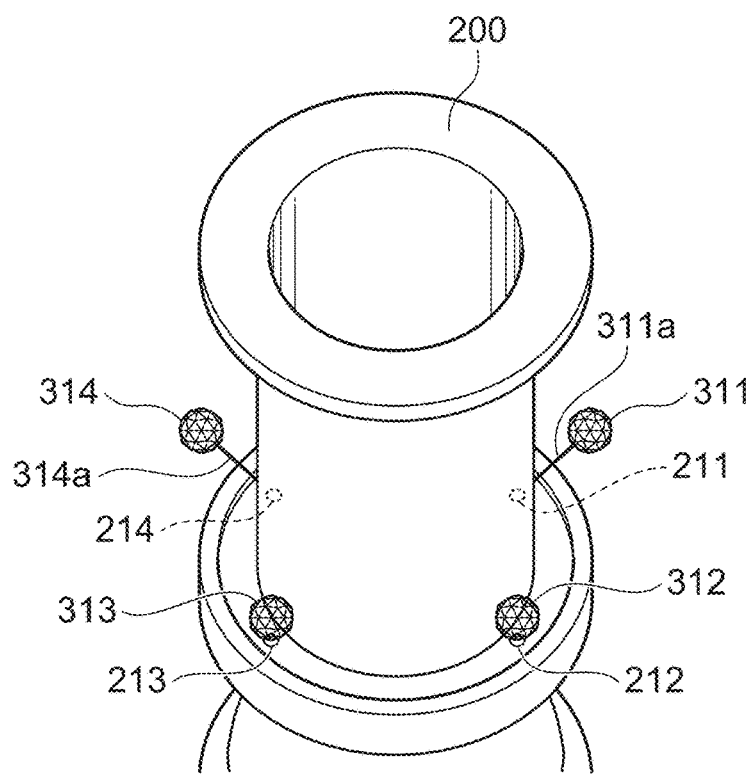

FIG. 15A and FIG. 15B show example display when determination regarding overlapping is performed. As a result of determination regarding overlapping, the external appearance of the virtual object 311 overlapping the article 200 and the external appearance of the virtual object 314 overlapping the article 200 change as shown in FIG. 15A. In the illustrated example, the virtual object 311 and the virtual object 314 are displayed lighter than the virtual object 312 and the virtual object 313.

In addition to the illustrated example, the virtual object 311 and the virtual object 314 may be displayed smaller in size than the virtual object 312 and the virtual object 313. The color of the virtual object 311 and the color of the virtual object 314 may be different from the color of the virtual object 312 and the color of the virtual object 313. For example, the virtual object 311 and the virtual object 314 may be displayed in a relatively light color, and the virtual object 312 and the virtual object 313 may be displayed in a relatively dark color.

Alternatively, the virtual object 311 and the virtual object 314 may be moved to positions at which the virtual object 311 and the virtual object 314 do not overlap the article 200 as shown in FIG. 15B. In this case, the distance between the virtual object 311 and the fastening location 211 becomes longer, and the distance between the virtual object 314 and the fastening location 214 becomes longer. In other words, the distance between the fastening location 211 and the virtual object 311 when the virtual object 311 is determined to be an overlapping object is longer than the distance between the fastening location 211 and the virtual object 311 when the virtual object 311 is not determined to be an overlapping object. The distance between the fastening location 214 and the virtual object 314 when the virtual object 314 is determined to be an overlapping object is longer than the distance between the fastening location 214 and the virtual object 314 when the virtual object 314 is not determined to be an overlapping object.

When an overlapping object is to be moved, the processing device 150 seeks the position after movement. Specifically, the processing device 150 calculates the center of gravity of the article 200 projected onto the virtual plane 350. The processing device 150 calculates the center of gravity of the overlapping object projected onto the virtual plane 350. The processing device 150 changes the position of the overlapping object in a direction from the center of gravity of the article 200 toward the center of gravity of the overlapping object. When the position of the overlapping object is changed, the processing device 150 uses the position after the movement to perform determination regarding overlapping again.

The position is repeatedly sought until an end condition is satisfied. As the end condition, the condition that the virtual object moves to a position at which the virtual object does not overlap the article 200 is set. In addition, the condition that movement of the virtual object and determination regarding overlapping are performed a specified number of times may be set as the end condition. When movement of the virtual object and determination regarding overlapping are performed the specified number of times but a position at which the virtual object does not overlap the article 200 is not found, the processing device 150 determines a position for which the area of the overlap between the article 200 and the virtual object is smallest to be the position of the virtual object after movement. The area of the overlap between the article 200 and the virtual object corresponds to the number of regions 351 that are assigned both the label of the article 200 and the label of the virtual object.

As a result of movement, a portion of the overlapping object may overlap the article 200 and the other portion of the overlapping object might not overlap the article 200. In this case, the processing device 150 may make the external appearance of the portion of the overlapping object and the external appearance of the other portion of the overlapping object different from each other. For example, the portion of the overlapping object is displayed lighter than the other portion of the overlapping object.

As the virtual object 311 and the virtual object 314 move away from the fastening location 211 and the fastening location 214 respectively, a virtual object 311a and a virtual object 314a are preferably displayed. The virtual object 311a represents the correspondence between the virtual object 311 and the fastening location 211. The virtual object 314a represents the correspondence between the virtual object 314 and the fastening location 214. The display of the virtual object 311a and the virtual object 314a allows the worker to easily grasp fastening locations to which the virtual object 311 and the virtual object 314 correspond.

Determination regarding overlapping is repeatedly performed. For example, determination regarding overlapping is performed repeatedly at predetermined intervals. Alternatively, determination regarding overlapping may be performed again when the orientation of the reference point or the position of the reference point changes. A change in the orientation or the position is determined on the basis of the result of detection by the sensor 140.

In an example, the worker moves about the article 200 and views the article 200 from the direction indicated by the arrow A1 shown in FIG. 14. Also in this case, the distance between the reference point and the article 200 and the distance between the reference point and each of the virtual objects 311 to 314 are calculated as in the example described above. It is determined whether each of the virtual objects 311 to 314 is positioned on the far side or on the near side of the article 200. Further, the virtual plane 350 is set, and it is determined whether the article 200 and a virtual object positioned on the far side overlap on the virtual plane 350. As a result, the virtual object 311 and the virtual object 312 are determined to be positioned on the near side of the article 200. The virtual object 313 and the virtual object 314 are determined to be positioned on the far side of the article 200. Further, the virtual object 313 and the virtual object 314 are determined to overlap the article 200.

Figure 16A:
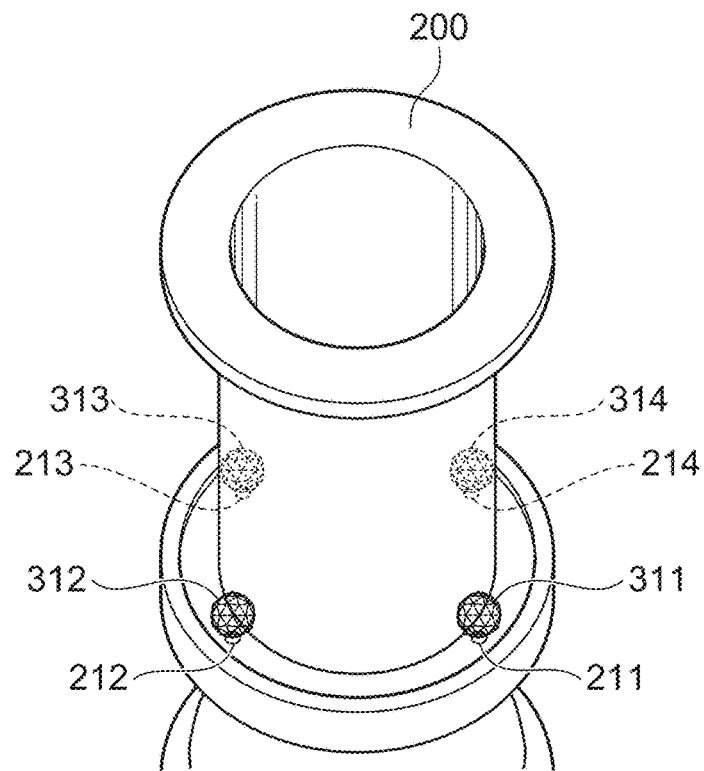
FIG. 16A and FIG. 16B are schematic views for explaining example display by the processing system according to the embodiment.

The processing device 150 makes the external appearance of the virtual object 313 and the external appearance of the virtual object 314 different from the external appearance of the virtual object 311 and the external appearance of the virtual object 312 as shown in, for example, FIG. 16A. That is, as the worker moves, the external appearance of the virtual object 313 changes from the state shown in FIG. 15A to the state shown in FIG. 16A. The virtual object 314 overlaps the article 200 both in the state shown in FIG. 15A and the state shown in FIG. 16A. Therefore, the external appearance of the virtual object 314 does not change during the transition from the state shown in FIG. 15A to the state shown in FIG. 16A. Further, in the state shown in FIG. 15A, the virtual object 311 is positioned on the far side of the article 200 and overlaps the article 200. In the state shown in FIG. 16A, the virtual object 311 is positioned on the near side of the article 200. Therefore, the external appearance of the virtual object 311 changes to an external appearance the same as the external appearance of the virtual object 312.

Figure 16B:
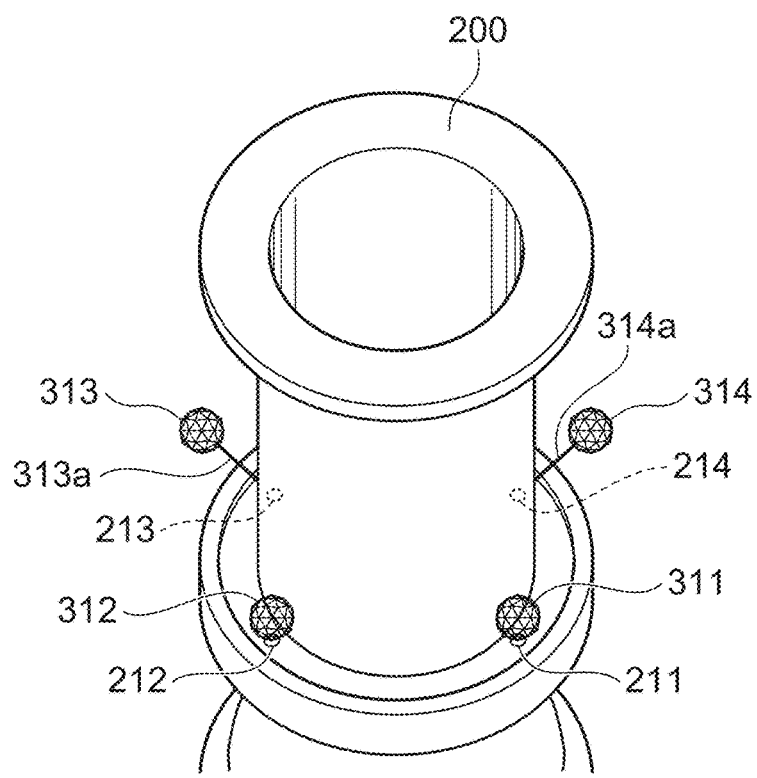
Figure 17:
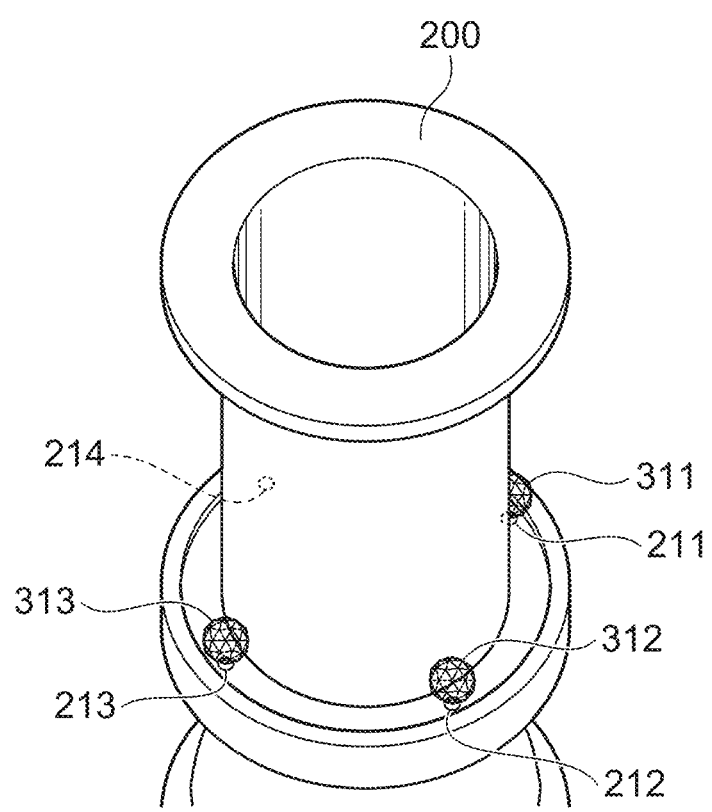
FIG. 17 is a schematic view for explaining example display by the processing system according to the embodiment.

Alternatively, the processing device 150 may change the position of the virtual object 313 and the position of the virtual object 314 as shown in FIG. 16B. In the state shown in FIG. 15B, the virtual object 311 and the virtual object 314 are displayed at positions away from the fastening location 211 and the fastening location 214 respectively. In the state shown in FIG. 16B, the virtual object 313 and the virtual object 314 are displayed at positions away from the fastening location 213 and the fastening location 214 respectively. For example, during the movement of the worker, the position of the virtual object 313 changes such that the virtual object 313 does not overlap the article 200. Further, during the movement of the worker, the position of the virtual object 311 approaches the fastening location 211 without overlapping the article 200.

A virtual object 313a representing the correspondence between the fastening location 213 and the virtual object 313 is displayed between the fastening location 213 and the virtual object 313. The virtual object 314a representing the correspondence between the fastening location 214 and the virtual object 314 is displayed between the fastening location 214 and the virtual object 314.

The processing device 150 may overlay and display an image of the article 200 captured by the image camera 131, at the position of the article 200. In this case, a virtual object that is positioned on the far side of the article 200 and that overlaps the article 200 is not displayed any more. In the example shown in FIG. 17, a portion of the virtual object 311 overlaps the article 200, and the whole of the virtual object 314 overlaps the article 200. In this case, the portion of the virtual object 311 and the whole of the virtual object 314 becomes non-visible to the worker.

The advantages of the embodiment of the invention will be described.

According to the embodiment of the invention, a virtual object corresponding to a fastening location is displayed. The virtual object is displayed at a position at which the worker is to place their hand when carrying out a task. The display of the virtual object allows the worker to easily and visually understand where to place their hand and at which fastening location the worker needs to turn a screw. Further, in this method, data indicating that a screw has been turned is associated with data regarding the estimated location, which enables automatic creation of a task record.

A virtual object is overlaid on the real space and displayed. When the positional relationships between an object in the real space and virtual objects are not taken into consideration, all of the virtual objects are overlaid on the real space and displayed as shown in FIG. 14. This leads to the possibility that the worker recognizes by mistake that a virtual object that is actually positioned on the far side of the object in the real space is present on the near side of the object. That is, the worker may have difficulty in recognizing the position at which the virtual object is present relative to the article in the real space. Further, the worker may misunderstand and reach out their hand to a virtual object on the far side and may consequently hit the hand on the article in the real space and be injured.

For this issue, determination regarding overlapping is performed in the embodiment. That is, determination is performed as to whether a virtual object is positioned on the far side of the object in the real space relative to the reference point and overlaps the object. When it is determined that an overlapping object is present, the processing device 150 changes the external appearance of the overlapping object. The change in the external appearance of the overlapping object allows the worker to easily grasp a virtual object that is actually positioned on the far side of the article.

Alternatively, the processing device 150 may change the position of an overlapping object in accordance with the result of determination regarding overlapping. The change in the position of the overlapping object allows the worker to easily grasp a virtual object that is actually positioned on the far side of the article.

According to the embodiment, the user of the MR device 100 can more easily grasp the positional relationship between an object in the real space and a virtual object in the virtual space. The use of the MR device 100 according to the embodiment in a task enables more efficient support of the task.

The processing device 150 repeatedly perform determination regarding overlapping. When the worker has moved, determination regarding overlapping is performed again on the basis of the reference point after the movement. For example, the external appearance or position of each virtual object changes as the reference point moves as shown in FIG. 15A to FIG. 16B. This enables real-time support of the worker carrying out a task.

FIG. 18A, FIG. 18B, FIG. 19, FIG. 20, FIG. 21A, and FIG. 21B are schematic views for explaining example display by the processing system according to the embodiment.

Figure 18A:
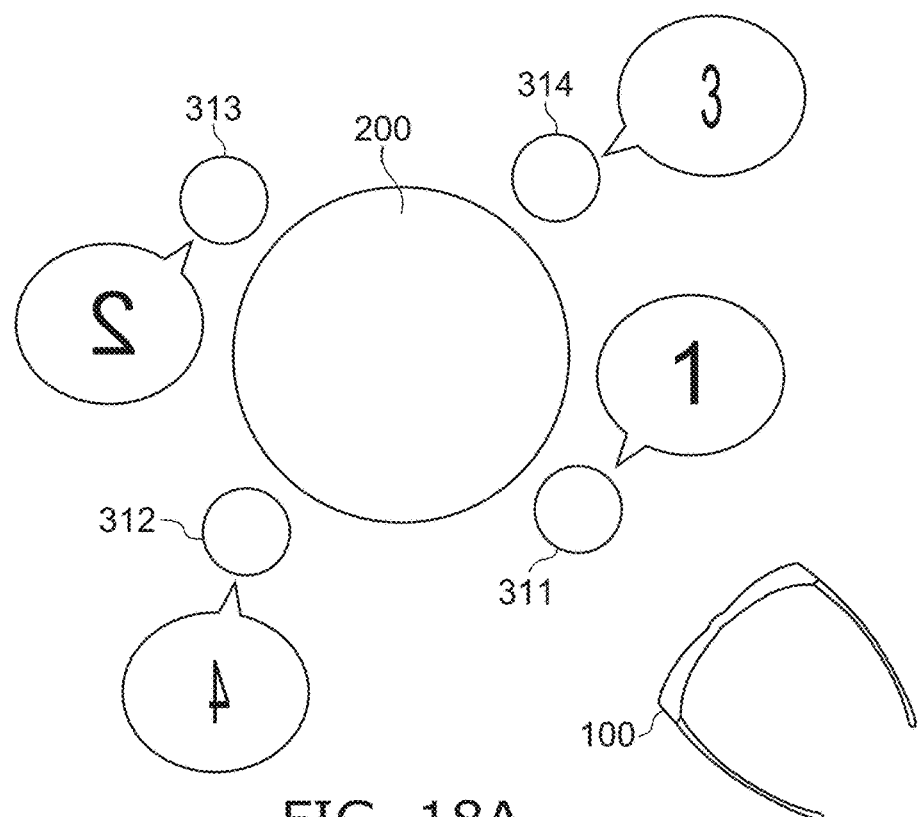
FIG. 18A and FIG. 18B are schematic views for explaining example display by the processing system according to the embodiment.

The processing device 150 may display information regarding a task, for virtual objects. For example, the processing device 150 may display numbers indicating the order of tasks at the fastening locations 211 to 214, for the virtual objects 311 to 314 respectively as shown in FIG. 18A. In FIG. 18A, a number displayed for each virtual object is put in a balloon.

Upon display of information for a virtual object, the processing device 150 may change the orientation of the information to be displayed, in accordance with the positional relationship between the object in the real space and the virtual object. In the example shown in FIG. 18A, the virtual object 311 for which "1" is displayed is positioned on the near side of the article 200 when viewed from the worker. The processing device 150 displays the number "1" so as to be oriented to the worker. The worker can view the normal number "1".

In contrast, the virtual object 313 for which "2" is displayed is positioned on the far side of the article 200 when viewed from the worker and overlaps the article 200. The processing device 150 displays the number "2" so as to be oriented opposite to the worker. As a result, the worker views the number "2" that is horizontally flipped. The virtual object 312 for which "4" is displayed and the virtual object 314 for which "3" is displayed are positioned on the respective sides of the article 200 when viewed from the worker. The processing device 150 displays the numbers "3" and "4" so as to be oriented to the respective sides of the article 200. As a result, the worker views the numbers "3" and "4" having a width narrower than usual.

The orientation of each piece of information is determined in accordance with the positional relationship between the article 200 and a corresponding one of the virtual objects. For example, information is oriented in a direction from the article 200 toward the virtual object and displayed. More specifically, the processing device 150 calculates the center of gravity of the article 200. The processing device 150 displays information in an orientation from the center of gravity of the article 200 toward the virtual object.

Figure 18B:
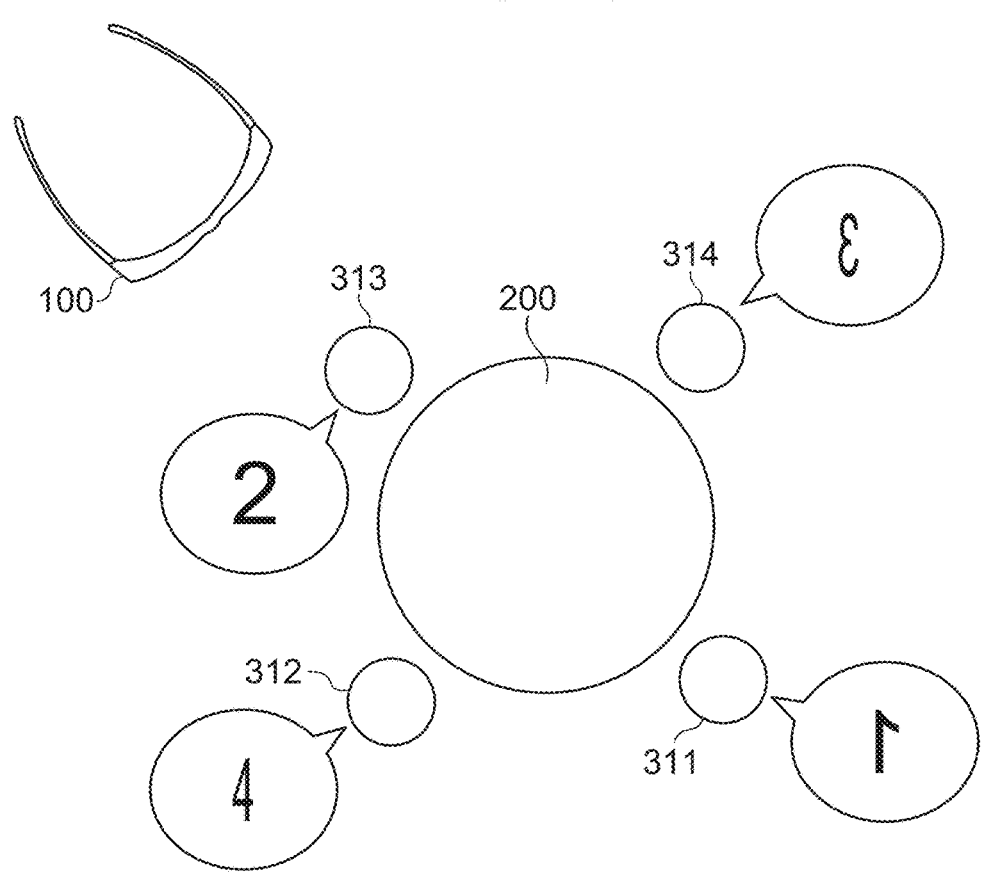

The orientation of information is repeatedly calculated. When the reference point moves, the orientation of information also changes. For example, when the worker moves to the opposite side of the article 200 as shown in FIG. 18B, the orientations of the respective pieces of information change from the state shown in FIG. 18A, and the pieces of information are horizontally flipped.

Figure 19:
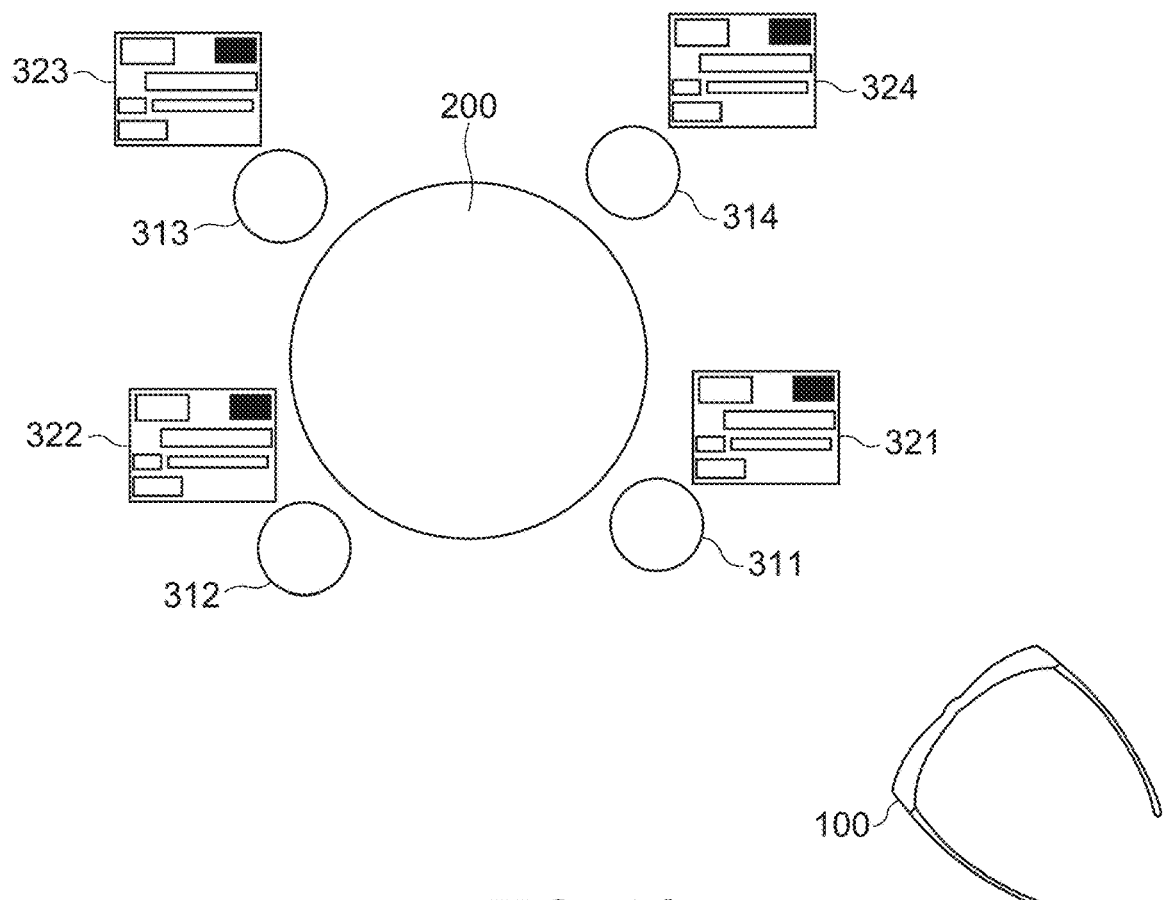
FIG. 19 is a schematic view for explaining example display by the processing system according to the embodiment.

Virtual objects 321 to 324 may be displayed in addition to the virtual objects 311 to 314 as shown in FIG. 19. The virtual objects 321 to 324 are adjacent to the virtual objects 311 to 314 respectively. The virtual objects 321 to 324 respectively include pieces of information regarding tightening of screws at the fastening locations 211 to 214.

Figure 20:
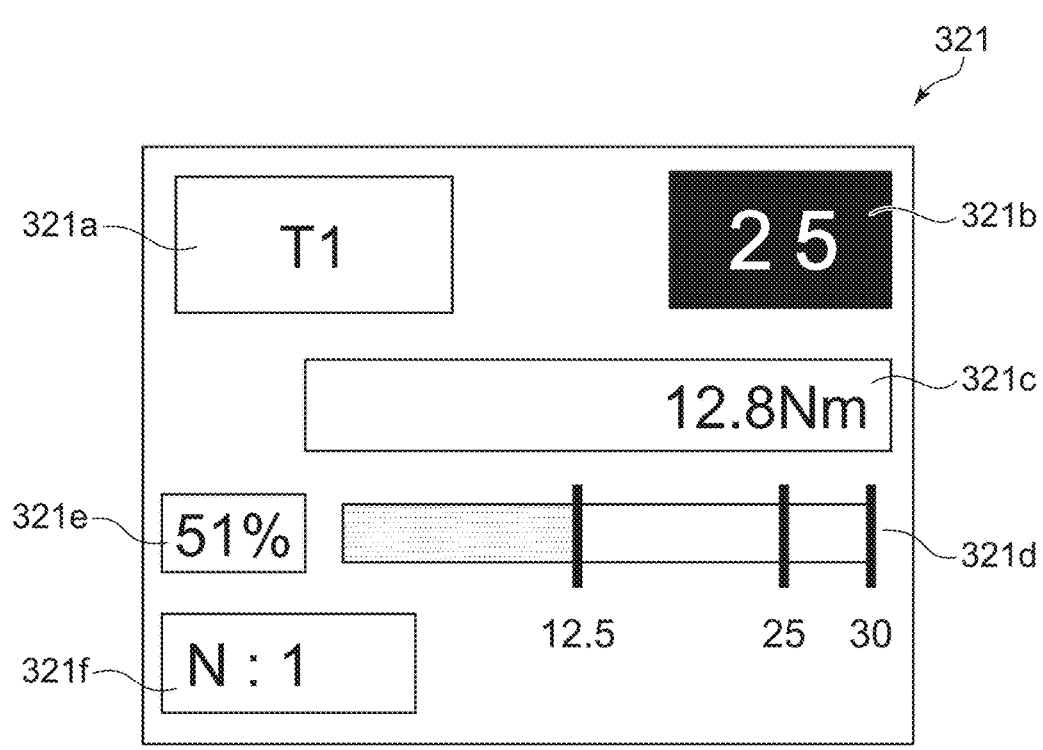
FIG. 20 is a schematic view for explaining example display by the processing system according to the embodiment.

For example, the virtual object 321 includes task information including an identification number 321a, a specified torque value 321b, a detected value 321c, a meter 321d, a percentage 321e, and a number of times 321f as shown in FIG. 20. The identification number 321a is the identification number of the fastening location 211. The specified torque value 321b is a torque value specified for tightening of a screw at the fastening location 211. The detected value 321c is a torque value detected by the tool. The meter 321d indicates the specified torque value and the detected torque value. The percentage 321e indicates the percentage of the detected value relative to the specified torque value.

Depending on the task, it is required to tighten a screw a plurality of times at one fastening location. In an example, for the fastening locations 211 to 214, it is specified that screws are tightened in the order of the fastening location 211, the fastening location 213, the fastening location 214, and the fastening location 212. Further, it is specified that, after tightening of screws at the respective fastening locations 211 to 214, the screws are tightened again in the same order. In this case, the number of times 321f indicates the number of times the screw has been tightened at the fastening location 211.

Figure 21A:
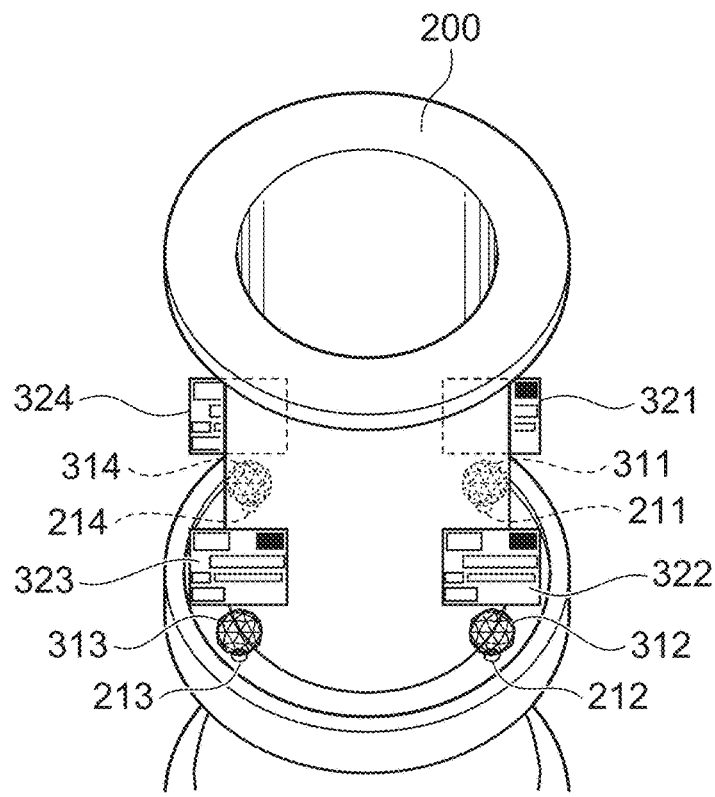
FIG. 21A and FIG. 21B are schematic views for explaining example display by the processing system according to the embodiment.
Figure 21B:
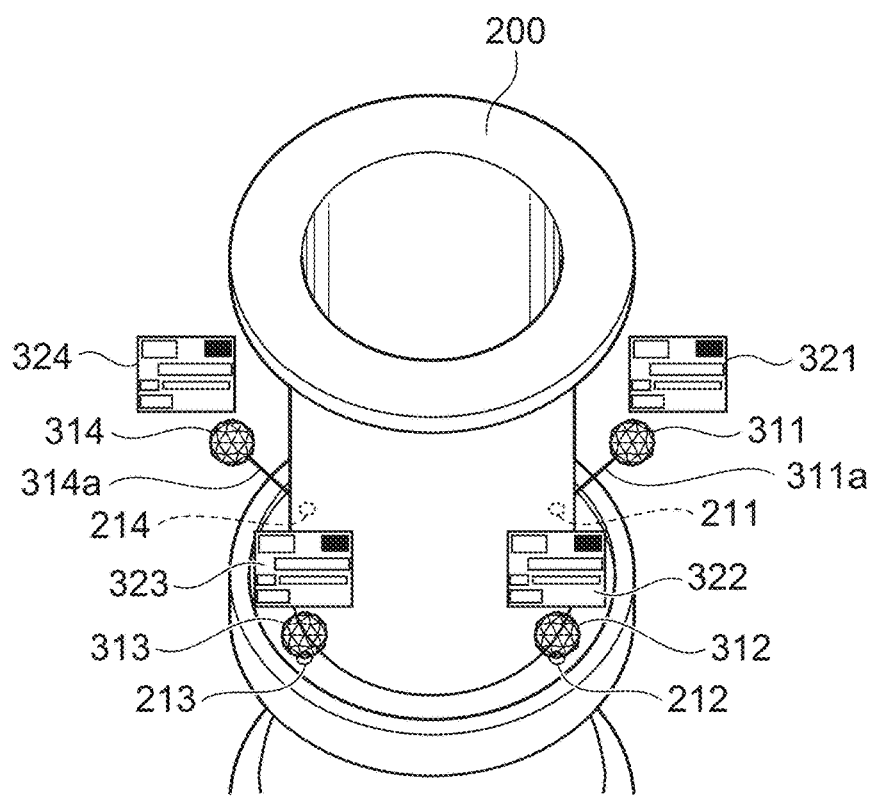

Determination as to whether the virtual objects 321 to 324 overlap the article 200 is also performed similarly to the virtual objects 311 to 314. In the example shown in FIG. 21A, among the virtual objects 321 to 324, the virtual objects 321 and 324 are determined to be overlapping objects. As a result, the virtual object 321 and the virtual object 324 are displayed so as to be different in external appearance from the virtual object 322 and the virtual object 323 similarly to the virtual objects 311 to 314, as shown in FIG. 21A. Alternatively, the positions of the virtual object 321 and the virtual object 324 change as shown in FIG. 21B.

Figure 22:
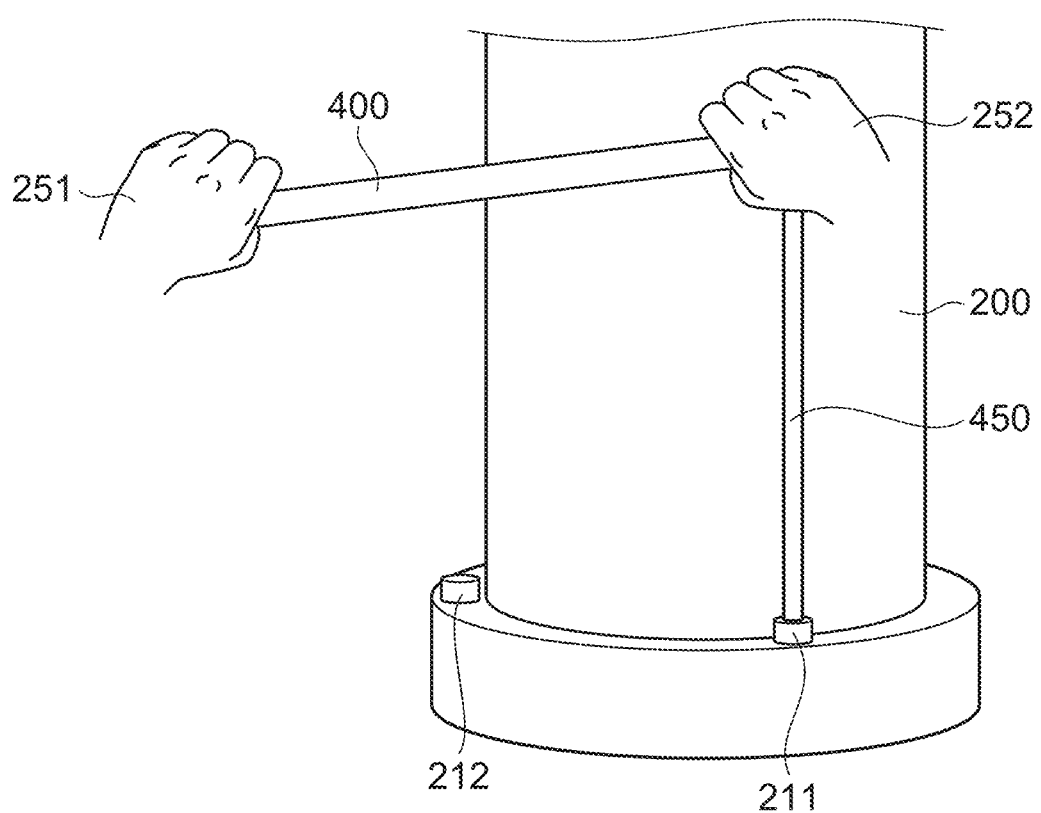
FIG. 22 is a schematic view illustrating the state of a task.

FIG. 22 is a schematic view illustrating the state of a task.

The positions of the virtual objects 311 to 314 are not limited to positions adjacent to the fastening locations 211 to 214 and can be set as appropriate in accordance with the tool to be used. For example, the wrench 400 and an extension bar 450 may be used in the task as shown in FIG. 22. The wrench 400 is used together with the extension bar 450 to tighten a screw at the fastening location.

Figure 23:
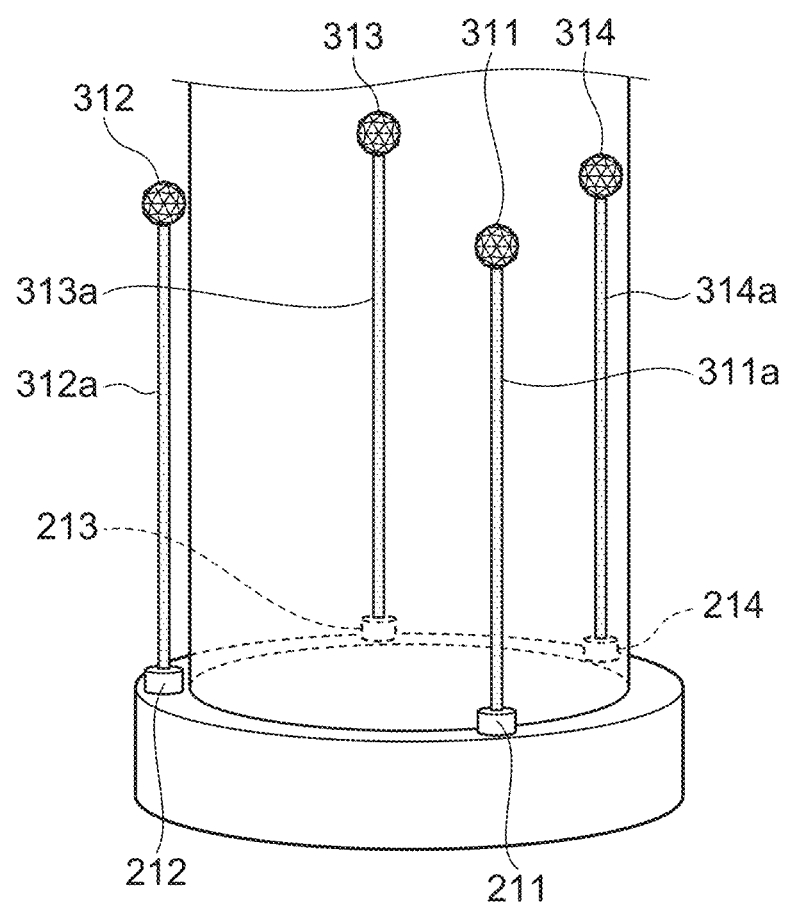
FIG. 23 is a schematic view for explaining example display by the processing system according to the embodiment.
Figure 24A:
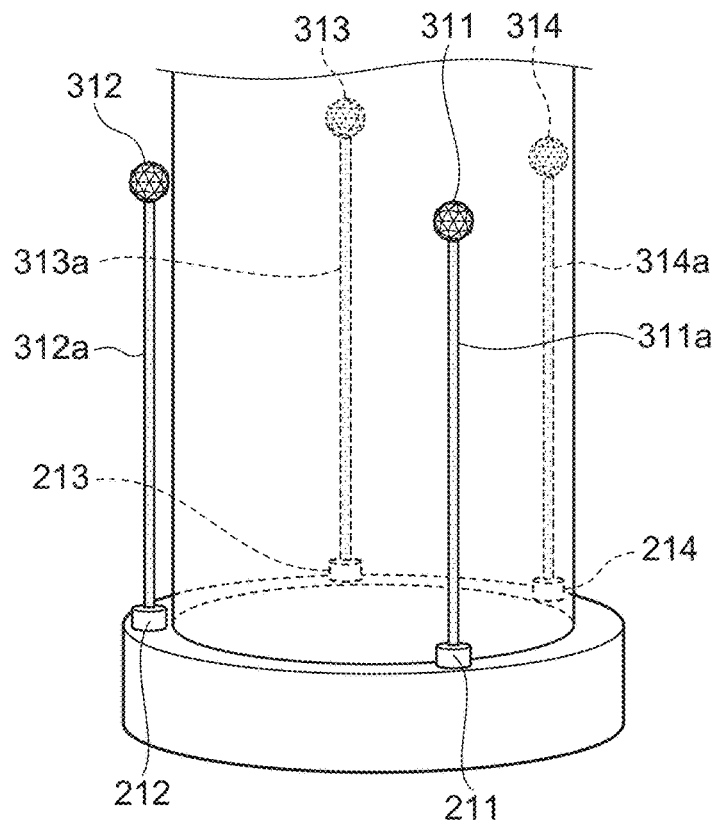
FIG. 24A and FIG. 24B are schematic views for explaining example display by the processing system according to the embodiment.
Figure 24B:
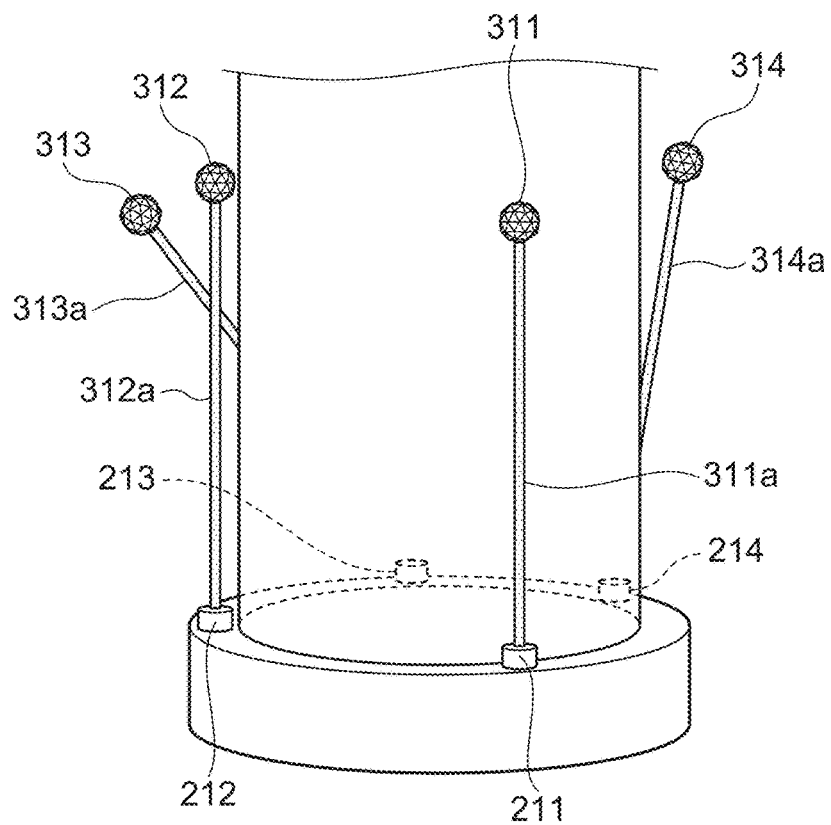

FIG. 23, FIG. 24A, and FIG. 24B are schematic views for explaining example display by the processing system according to the embodiment.

When the task shown in FIG. 22 is carried out, the processing device 150 displays the virtual objects 311 to 314 at positions away from the fastening locations 211 to 214 as shown in FIG. 23. The fastening locations 211 to 214 are respectively away from the virtual objects 311 to 314 by the length of the extension bar 450. In this case, preferably, the virtual objects 311a to 314a indicating that the virtual objects 311 to 314 respectively correspond to the fastening locations 211 to 214 are displayed. The virtual objects 311a, 312a, 313a, and 314a are displayed between the fastening location 211 and the virtual object 311, between the fastening location 212 and the virtual object 312, between the fastening location 213 and the virtual object 313, and between the fastening location 214 and the virtual object 314 respectively. The display of the virtual objects 311a to 314a allows the worker to easily grasp fastening locations to which the virtual objects 311 to 314 correspond.

The processing device 150 performs determination regarding overlapping for each of the virtual objects 311 to 314 and the virtual objects 311a to 314a. As a result, the virtual object 313, the virtual object 313a, the virtual object 314, and the virtual object 314a are determined to be overlapping objects. The external appearance of each of the virtual object 313, the virtual object 313a, the virtual object 314, and the virtual object 314a changes as shown in FIG. 24A. Alternatively, the position of each of the virtual object 313, the virtual object 313a, the virtual object 314, and the virtual object 314a changes as shown in FIG. 24B.

Figure 25:
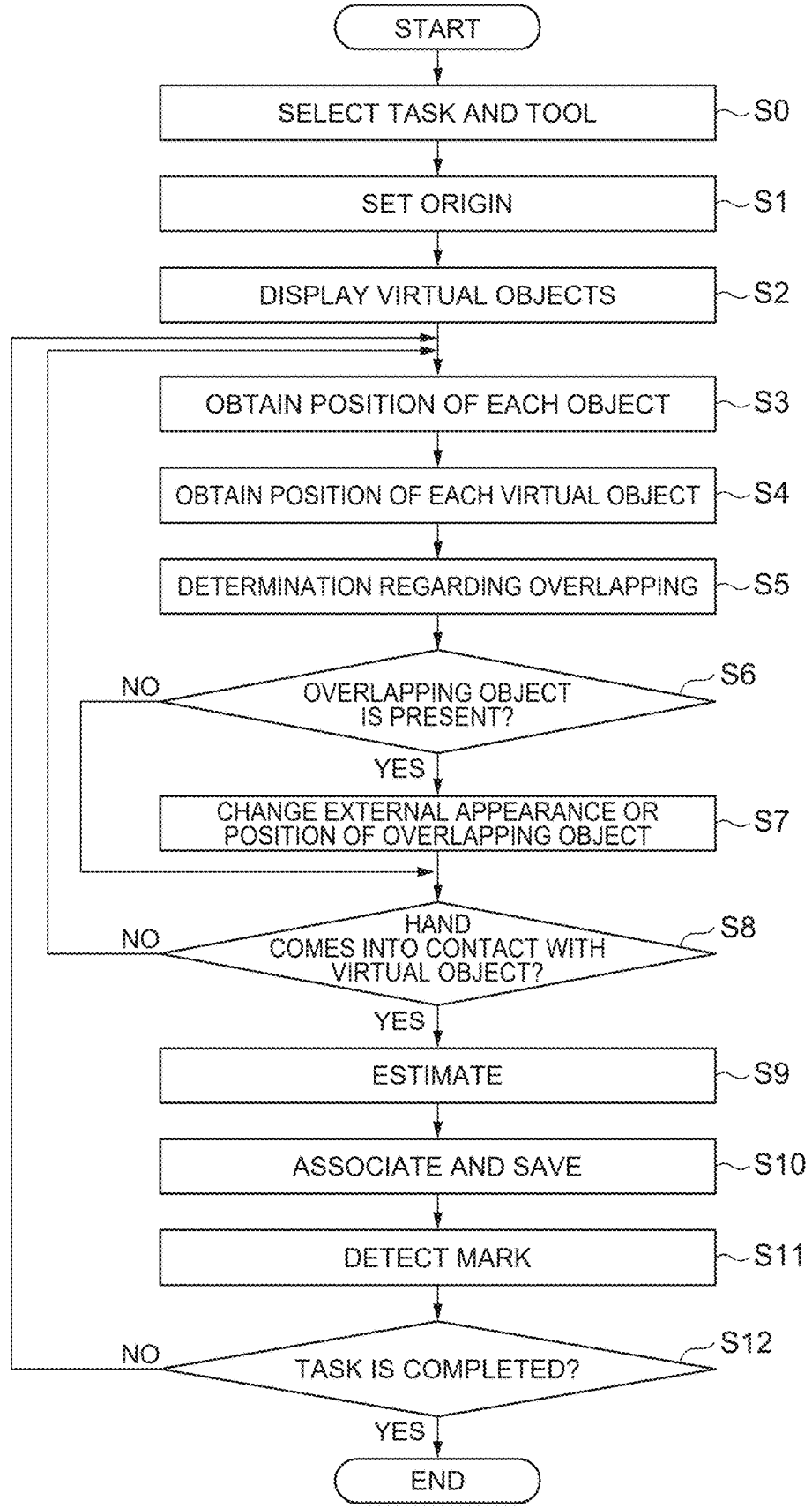
FIG. 25 is a flowchart showing an example of a processing method according to the embodiment.

FIG. 25 is a flowchart showing an example of a processing method according to the embodiment.

In the processing method shown in FIG. 25, the processing device 150 first accepts selection of a task and a tool (step S0). A task and a tool are selected by the worker. A task to be carried out and a tool to be used may be specified by a higher-level system, and the processing device 150 may accept the selection by the higher-level system. The processing device 150 may determine a task to be carried out and a tool to be used, on the basis of data obtained from the image camera 131 or other sensors. The processing device 150 accepts selection based on the results of determination.

Next, the processing device 150 sets the origin (step S1). The origin is set on the basis of a marker or a hand gesture. The processing device 150 sets a three-dimensional coordinate system on the basis of the set origin and displays one or more virtual objects in the virtual space (step S2). The processing device 150 obtains the position of each object in the real space (step S3). The position of each object is obtained from a depth image. The position of each object may be registered in advance. The processing device 150 obtains the position of each virtual object in the virtual space (step S4). The processing device 150 uses the obtained position to perform determination regarding overlapping (step S5). That is, the processing device 150 determines whether any of the virtual objects is positioned on the far side of an object in the real space and overlaps the object.

The processing device 150 determines whether an overlapping object is present, on the basis of the result of determination regarding overlapping (step S6). If an overlapping object is not present, the processing device 150 maintains the external appearances and positions of the respective virtual objects as in the state when they are displayed in step S1. If an overlapping object is present, the processing device 150 changes the external appearance or position of the overlapping object (step S7).

The processing device 150 determines whether a hand comes into contact with any of the virtual objects (step S8). If a hand does not come into contact with any virtual object, the processing device 150 performs step S3 again. If a hand comes into contact with a virtual object, the processing device 150 estimates that a screw is being turned at a fastening location corresponding to the virtual object (step S9). The processing device 150 receives a detected value from the tool. The processing device 150 associates the detected value with data regarding the fastening location and saves the associated data (step S10).

On the tightened screw, a mark indicating task completion may be put. When completing screw tightening, the worker puts a mark on the screw or its vicinity. The tool for screw tightening may automatically put a mark upon completion. The processing device 150 may detect the mark from an image (step S11). When determining that screw tightening is completed, the processing device 150 refers to the color of the mark used in the screw tightening. The processing device 150 determines whether the number of pixels in the color of the mark exceeds a preset threshold value in the image. When the number of pixels exceeds the threshold value, the processing device 150 determines that the mark is put on the screw. The processing device 150 further associates a detection result indicating that the mark has been detected, with the data regarding the fastening location. The processing device 150 determines whether the task is completed (step S12). If the task is not completed, step S3 is performed again.

The order of processes shown in FIG. 25 can be changed as appropriate. For example, steps S3 to S7 may be performed in parallel with steps S8 to S11. Steps S8 to S11 may be performed before steps S3 to S7.

The worker can move the origin in the middle of a task. The worker provides, to the processing device 150, an instruction for moving the origin. The instruction may be input by using the input device 3 or may be input with a hand gesture indicating movement of the origin. When accepting input, the processing device 150 stops the process that is being performed and transitions to step S1. Based on the reset origin, each virtual object is displayed.

Figure 26:
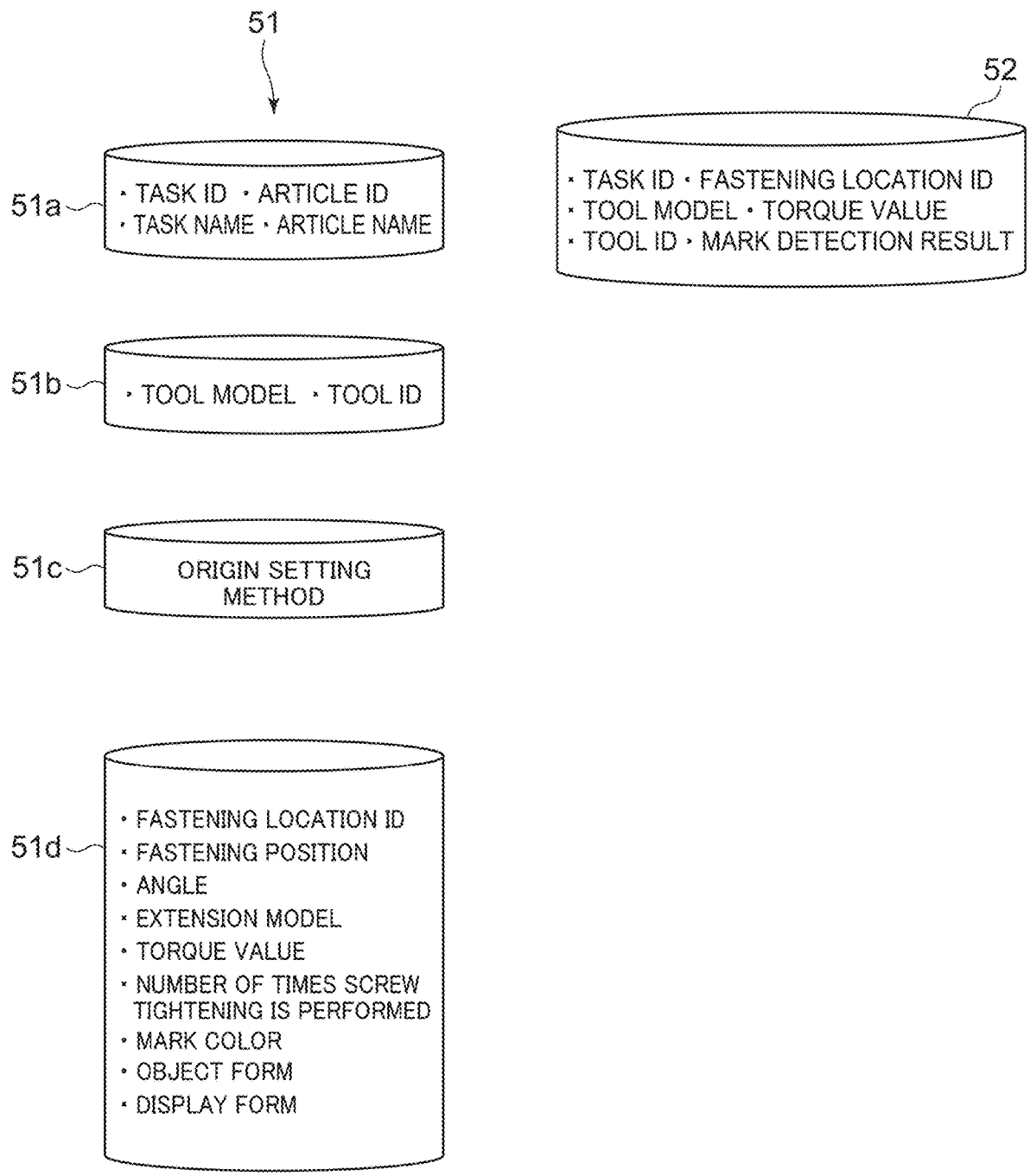
FIG. 26 is a schematic diagram illustrating data referred to in the embodiment.

FIG. 26 is a schematic diagram illustrating data referred to in the embodiment.

The storage device 5 stores master data 51 and history data 52. The master data 51 includes task master data 51a, tool master data 51b, origin master data 51c, and fastening location master data 51d. The master data 51 is prepared before screw tightening.

As the task master data 51a, task IDs, task names, article IDs, and article names are saved. The processing device 150 can accept any of a task ID, a task name, an article ID, or an article name as a selection from tasks.

As the tool master data 51b, tool models and tool IDs are saved. Each tool model indicates the classification of the tool by, for example, its structure, external form, or performance. The processing device 150 can accept any of a tool model or a tool ID as a selection from tools.

As the origin master data 51c, a task-by-task origin setting method is saved. The processing device 150 sets the origin in accordance with the task-by-task origin setting method.

As the fastening location master data 51d, fastening location IDs are saved, and a fastening position, an angle, an extension model, a torque value, the number of times screw tightening is performed, a mark color, an object form, and a display form are saved on a tightening-location-ID-by-tightening-location-ID basis. Each fastening position indicates the position of a corresponding one of the fastening locations. Each angle indicates the angle of a tool or an extension bar upon screw tightening at a corresponding one of the fastening locations. Each extension model indicates the classification of the extension bar by, for example, its structure, external form, or performance. Each torque value indicates the magnitude of a torque necessary upon screw tightening at a corresponding one of the fastening locations. Each number of times screw tightening is performed indicates the number of times screw tightening is performed at a corresponding one of the fastening locations. Each mark color is the color of the mark indicating completion of screw tightening. Each virtual object form indicates the form of a virtual object to be displayed at a corresponding one of the fastening locations. Each display form indicates the form of the virtual object to be displayed. The display form may be set for each number of times screw tightening is performed.

The position at which each virtual object is displayed is calculated on the basis of, for example, the origin, the fastening position, the angle, and the extension model. For example, the length of an extension bar is identified from the extension model. A first virtual object is displayed at a position that is away from the fastening position by the length of the extension bar at the set angle relative to the fastening position. A virtual object is displayed in a region having the length of the extension bar at the set angle relative to the fastening position.

Here, an example in which the embodiment of the invention is applied to a task of tightening screws has been mainly described. The embodiment of the invention may be applied to a task of loosening screws. Upon loosening a screw, a tool is also used as shown in FIG. 7 to turn the screw. Also in this case, the display of a virtual object allows the task to be efficiently carried out. Further, the performing of determination regarding overlapping allows the user of the MR device 100 to more easily grasp the positional relationship between an object in the real space and a virtual object in the virtual space.

Figure 27:
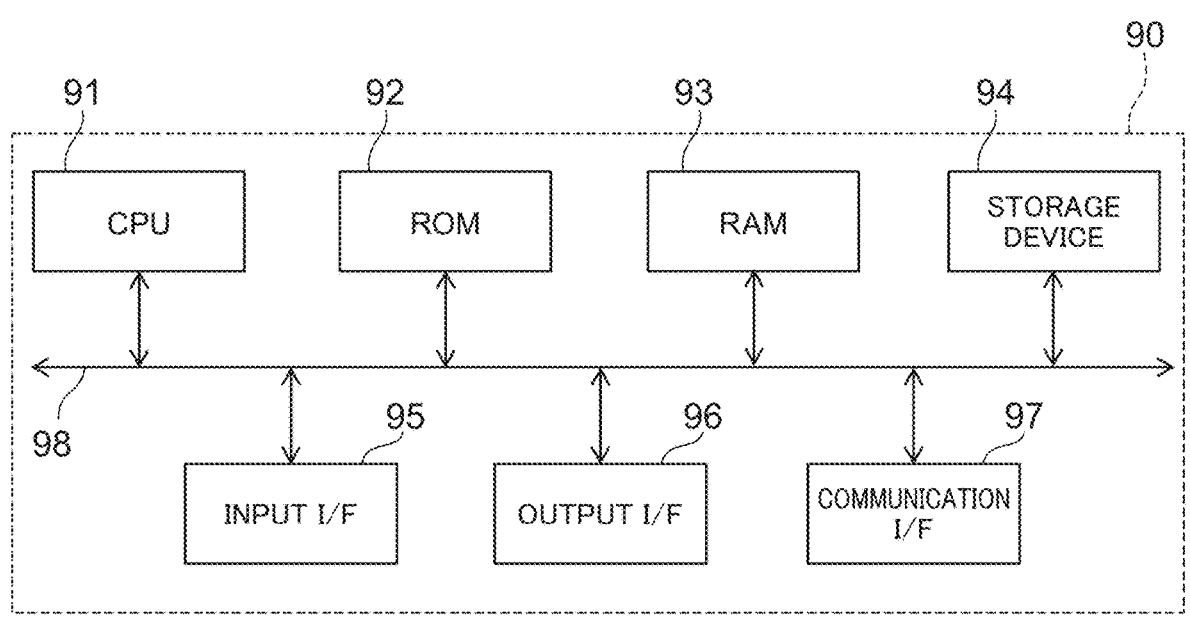
FIG. 27 is a schematic diagram showing a hardware configuration.

FIG. 27 is a schematic diagram showing a hardware configuration.

As the processing device 2 or the processing device 150, for example, a computer 90 shown in FIG. 27 is used. The computer 90 includes a CPU 91, a ROM 92, a RAM 93, a storage device 94, an input interface 95, an output interface 96, and a communication interface 97.

The ROM 92 stores a program for controlling operations of the computer 90. In the ROM 92, a program necessary for causing the computer 90 to implement the above-described processes is stored. The RAM 93 functions as a storage area to which the programs stored in the ROM 92 are loaded.

The CPU 91 includes a processing circuit. The CPU 91 uses the RAM 93 as a work memory to execute programs stored in at least either the ROM 92 or the storage device 94. While executing the programs, the CPU 91 controls each component via a system bus 98 to perform various processes.

The storage device 94 stores data necessary for execution of programs and data obtained as a result of execution of programs. The storage device 94 includes, for example, a solid state drive (SSD). The storage device 94 may be used as the storage device 5 or the storage device 170.

The input interface (I/F) 95 is capable of connecting the computer 90 with the input device 3. The CPU 91 can read various types of data from the input device 3 via the input I/F 95.

The output interface (I/F) 96 is capable of connecting the computer 90 with an output device. The CPU 91 can transmit data to the display device 4 via the output I/F 96 to cause the display device 4 to display information.

The communication interface (I/F) 97 is capable of connecting a device outside the computer 90 with the computer 90. The communication I/F 97 connects, for example, a digital tool with the computer 90 through Bluetooth (registered trademark) communication.

Data processing by the processing device 2 or the processing device 150 may be performed by only one computer, namely, the computer 90. Part of the data processing may be performed by a server via the communication I/F 97.

Processing of various types of data described above may be recorded, as a program that can be executed by a computer, on a magnetic disk (examples of which include a flexible disk and a hard disk), an optical disk (examples of which include a CD-ROM, a CD-R, a CD-RW, a DVD-ROM, a DVD±R, and DVD±RW), a semiconductor memory, or another non-transitory computer-readable storage medium.

For example, information recorded on a recording medium can be read by a computer (or an embedded system). The recording medium can have any record format (storage format). For example, the computer reads a program from the recording medium and causes the CPU to execute instructions described in the program, on the basis of the program. The computer may obtain (or read) the program through a network.

In the embodiment described above, an example in which the processing system 10 is implemented as an MR device has been mainly described. The invention according to the embodiment is not limited to this example. The processing system 10 may be implemented as a general-purpose personal computer. In this case, for example, a keyboard, a microphone, or a touch pad is used as the input device 3. As the display device 4, a monitor is used.

In the embodiment described above, an example in which the processing system 10 and the MR device 100 are used in a task has been described. This example is not restrictive, and the processing system 10 and the MR device 100 may be used other than a task. Also in this case, the performing of determination regarding overlapping allows the user of the MR device 100 to more easily grasp the positional relationship between an object in the real space and a virtual object in the virtual space.

The embodiment of the invention includes the following features.

Feature 1

A mixed reality device overlaying, on a real space, and displaying a virtual object in a virtual space, the mixed reality device being configured to:
 obtain a position of an object in the real space and a position of the virtual object; and
 change an external appearance of the virtual object when the virtual object is positioned on a far side of the object relative to the mixed reality device and overlaps the object.

Feature 2

The device according to feature 1, further configured to obtain a depth image of the real space and obtain the position of the object from the depth image.

Feature 3

The device according to feature 2, further configured to
 set a virtual plane on a near side of the object and the virtual object, and
 determine whether the virtual object overlaps the object, by projecting the object and the virtual object onto the virtual plane.

Feature 4

The device according to feature 2 or 3, in which
 the depth image is mesh data including a plurality of meshes, and
 the device is further configured to
  extract, from among the plurality of meshes, a mesh for which a distance between the mesh and a straight line connecting the mixed reality device and the virtual object is less than a threshold value, and
  determine whether the virtual object is positioned on a far side of the extracted mesh and overlaps the extracted mesh.

Feature 5

The device according to any one of features 1 to 4, further configured to change a color or a size of the virtual object, when the virtual object is positioned on a far side of the object relative to the mixed reality device and overlaps the object.

Feature 6

The device according to any one of features 1 to 4, further configured to overlay, on the object, and display an image of the object, when the virtual object is positioned on a far side of the object relative to the mixed reality device and overlaps the object.

Feature 7

The device according to any one of features 1 to 6, further configured to
 set a three-dimensional coordinate system while using a marker provided in the real space as an origin, and
 cause the virtual object to be displayed at a position registered in advance in the three-dimensional coordinate system.

Feature 8

The device according to any one of features 1 to 7, in which
 the virtual object is displayed so as to correspond to a fastening location of an article in the real space.

Feature 9

The device according to feature 8, further configured to
 receive, from a tool for tightening a screw at the fastening location, a detected value detected by the tool, and
 associate the detected value with data regarding the fastening location when a hand or the tool comes into contact with the virtual object.

Feature 10

The device according to feature 8 or 9, further configured to
 cause information regarding a task at the fastening location to be displayed for the virtual object, and display the information so as to be oriented in a direction from the article toward the virtual object.

Feature 11

A processing device configured to:
obtain a position of an object in a real space and a position of a virtual object in a virtual space overlaid on the real space and displayed; and
change an external appearance of the virtual object in the virtual space when the virtual object is positioned on a far side of the object relative to a reference point and overlaps the object.

Feature 12

A processing method causing a processing device to:
obtain a position of an object in a real space and a position of a virtual object in a virtual space overlaid on the real space and displayed; and
change an external appearance of the virtual object in the virtual space when the virtual object is positioned on a far side of the object relative to a reference point and overlaps the object.

Feature 13

A program for causing the processing device to perform the processing method according to feature 12.

Feature 14

A storage medium storing the program according to feature 13.

According to the embodiment described above, a mixed reality device, a processing device, a processing method, a program, and a storage medium that allow the user of the MR device to more easily grasp the positional relationship between an object in the real space and a virtual object in the virtual space are provided. According to the embodiment, a fastening task with a screw can be supported more appropriately.

In the specification, "or" indicates that "at least one or more" of items enumerated in the sentence can be adopted.

Although some embodiments of the invention have been described above, these embodiments have been presented by way of example and are not intended to limit the scope of the invention. These novel embodiments can be implemented in a variety of other forms, and various omissions, substitutions, changes, and the like can be made without departing from the gist of the invention. Such embodiments or their modifications fall within the scope of the invention as defined in the claims and their equivalents as well as within the scope and gist of the invention. Further, the above-described embodiments can be implemented in combination with each other.

What is claimed is:
1. A mixed reality device overlaying, on a real space, and displaying a virtual object in a virtual space, the mixed reality device being configured to:
obtain a position of an object in the real space and a position of the virtual object;
change an external appearance of the virtual object when the virtual object is positioned on a far side of the object relative to the mixed reality device and overlaps the object;
obtain a depth image of the real space and obtain the position of the object from the depth image, wherein the depth image is mesh data including a plurality of meshes;
extract, from among the plurality of meshes, a mesh for which a distance between the mesh and a straight line connecting the mixed reality device and the virtual object is less than a threshold value; and
determine whether the virtual object is positioned on a far side of the extracted mesh and overlaps the extracted mesh.

2. The device according to claim 1, further configured to set a virtual plane on a near side of the object and the virtual object, and
determine whether the virtual object overlaps the object, by projecting the object and the virtual object onto the virtual plane.

3. The device according to claim 1, further configured to change a color or a size of the virtual object, when the virtual object is positioned on a far side of the object relative to the mixed reality device and overlaps the object.

4. The device according to claim 1, further configured to overlay, on the object, and display an image of the object, when the virtual object is positioned on a far side of the object relative to the mixed reality device and overlaps the object.

5. The device according to claim 1, further configured to set a three-dimensional coordinate system while using a marker provided in the real space as an origin, and
cause the virtual object to be displayed at a position registered in advance in the three-dimensional coordinate system.

6. The device according to claim 1, wherein
the virtual object is displayed so as to correspond to a fastening location of an article in the real space.

7. The device according to claim 6, further configured to receive, from a tool for tightening a screw at the fastening location, a detected value detected by the tool, and
associate the detected value with data regarding the fastening location when a hand or the tool comes into contact with the virtual object.

8. The device according to claim 6, further configured to cause information regarding a task at the fastening location to be displayed for the virtual object, and
display the information so as to be oriented in a direction from the article toward the virtual object.

9. A processing device configured to:
obtain a position of an object in a real space and a position of a virtual object in a virtual space overlaid on the real space and displayed;
change an external appearance of the virtual object in the virtual space when the virtual object is positioned on a far side of the object relative to a reference point and overlaps the object;
obtain a depth image of the real space and obtain the position of the object from the depth image, wherein the depth image is mesh data including a plurality of meshes;
extract, from among the plurality of meshes, a mesh for which a distance between the mesh and a straight line connecting the processing device and the virtual object is less than a threshold value; and
determine whether the virtual object is positioned on a far side of the extracted mesh and overlaps the extracted mesh.

10. A processing method causing a processing device to:
obtain a position of an object in a real space and a position of a virtual object in a virtual space overlaid on the real space and displayed;
change an external appearance of the virtual object in the virtual space when the virtual object is positioned on a far side of the object relative to a reference point and overlaps the object;
obtain a depth image of the real space and obtain the position of the object from the depth image, wherein the depth image is mesh data including a plurality of meshes;
extract, from among the plurality of meshes, a mesh for which a distance between the mesh and a straight line connecting the processing device and the virtual object is less than a threshold value; and
determine whether the virtual object is positioned on a far side of the extracted mesh and overlaps the extracted mesh.

11. A non-transitory computer-readable storage medium storing a program for causing the processing device to perform the processing method according to claim 10.

* * * * *